United States Patent [19]

Srinivasan

[11] Patent Number: 5,765,159

[45] Date of Patent: Jun. 9, 1998

[54] SYSTEM AND METHOD FOR GENERATING AN OPTIMIZED SET OF RELATIONAL QUERIES FOR FETCHING DATA FROM A RELATIONAL DATABASE MANAGEMENT SYSTEM IN RESPONSE TO OBJECT QUERIES RECEIVED FROM AN OBJECT ORIENTED ENVIRONMENT

[75] Inventor: Venkatachary Srinivasan, Santa Clara, Calif.

[73] Assignee: International Business Machines Corporation, Armonk, N.Y.

[21] Appl. No.: 870,581

[22] Filed: May 21, 1997

Related U.S. Application Data

[63] Continuation of Ser. No. 366,238, Dec. 29, 1994, abandoned.

[51] Int. Cl.⁶ .................................................... G06F 17/30
[52] U.S. Cl. ........................... 707/102; 707/3; 707/4; 707/100; 707/103
[58] Field of Search ............................ 395/613, 603, 395/604, 611, 614; 707/3, 4, 102, 103, 100

[56] References Cited

U.S. PATENT DOCUMENTS

| | | | |
|---|---|---|---|
| 5,212,787 | 5/1993 | Baker et al. | 395/600 |
| 5,263,167 | 11/1993 | Conner, Jr. et al. | 395/700 |
| 5,291,583 | 3/1994 | Bapat | 395/500 |
| 5,295,256 | 3/1994 | Bapat | 395/500 |
| 5,379,419 | 1/1995 | Heffernan et al. | 395/600 |
| 5,426,780 | 6/1995 | Gerull et al. | 395/600 |
| 5,448,727 | 9/1995 | Annevelink | 395/600 |
| 5,450,581 | 9/1995 | Bergen et al. | 355/600 |
| 5,499,371 | 3/1996 | Henninger et al. | 395/700 |
| 5,504,885 | 4/1996 | Alashqur | 395/600 |
| 5,548,749 | 8/1996 | Kroenke et al. | 395/600 |
| 5,550,971 | 8/1996 | Brunner et al. | 395/161 |
| 5,564,113 | 10/1996 | Bergen et al. | 395/600 |
| 5,596,746 | 1/1997 | Shen et al. | 395/612 |
| 5,615,362 | 3/1997 | Jensen et al. | 711/103 |
| 5,694,598 | 12/1997 | Durand et al. | 1/1 |

OTHER PUBLICATIONS

Kemper et al., "Adaptable Pointer Swizzling Strategies in Object Bases," *IEEE*, RWTH Technical University, Aachen, Germany, 1993, pp. 155–162.

Eliot et al., "Working with Persistent Objects: to Swizzler or Not to Swizzle," *IEEE Transactions on Software Engineering*, vol. 18, No. 8, Aug., 1992, pp. 657–673.

Urban et al., "An Object–Oriented Query Language Interface to Relational Databases in a Multidatabase Database Environment," *IEEE*, Arizona State University, 1994, pp. 387–394.

Domscheit et al., "Conflict Assessment with Pending Patent Applications for Silver Edition 1," *Böblingen Programming Lab*, Jul. 31, 1995, pp. ii–9.

Orenstein et al., "Query Processing in the ObjectStore Database System," *Proceedings of the ACM SIGMOD Conference*, Jun., 1992, San Diego, California, pp. 403–412.

*Primary Examiner*—Thomas G. Black
*Assistant Examiner*—Jean R. Homere
*Attorney, Agent, or Firm*—Sterne, Kessler, Goldstein & Fox P.L.L.C.; David J. Kappos, Esq.

[57] ABSTRACT

The processing of object-oriented queries so as to retrieve data from a relational database management system (RDBMS) is described. An object-oriented query and at least one prefetch path are received from an object-oriented source (such as an application or user). The prefetch path identifies one or more objects which are desired to be constructed. The object-oriented query is translated to a translated object query, where the translated object query is a relational database query capable of retrieving from the RDBMS data to initialize base attributes of top-level objects identified by the object-oriented query. A set of relational queries is generated from the translated object query and the prefetch path. These relational queries, which are capable of retrieving from the RDBMS data needed to construct the objects identified by the prefetch path, are processed by the RDBMS.

28 Claims, 17 Drawing Sheets

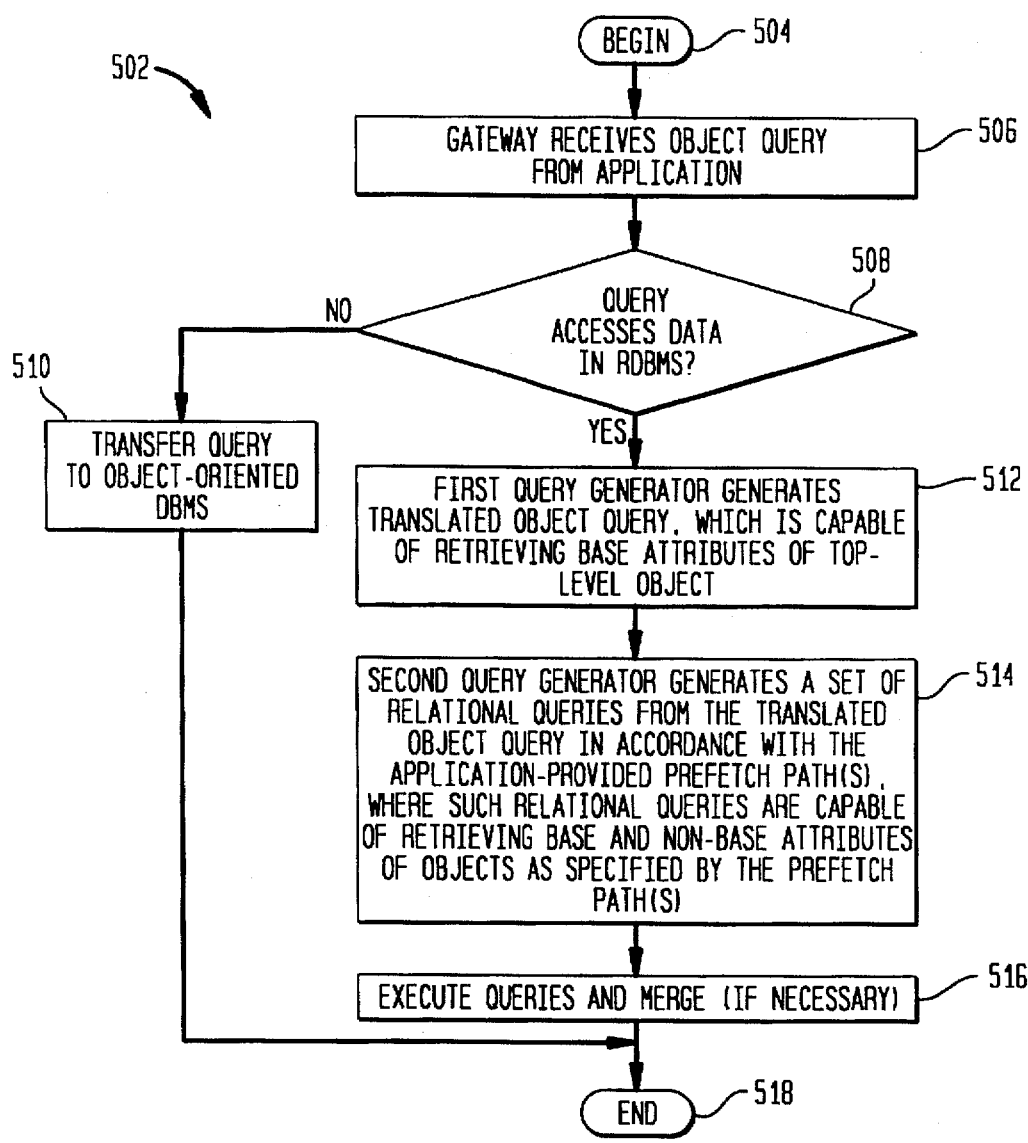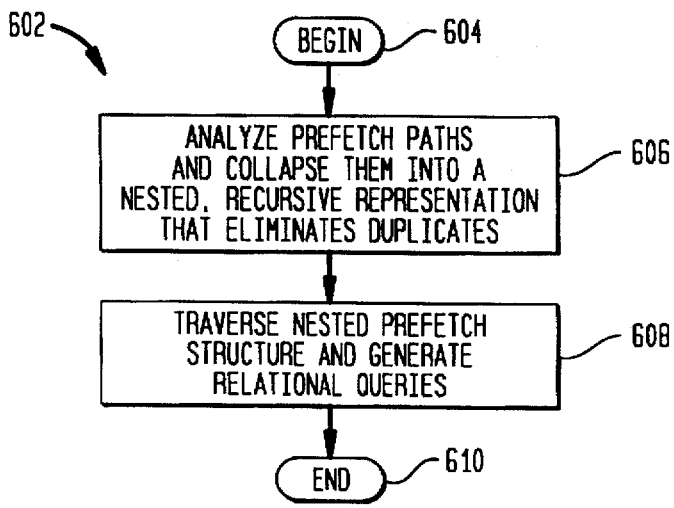

FIG. 8

```
Object Query
    Emp[:salary > 10 && Dept[:count>1000:]:]

Prefetch Path Component
    Emp.Dept

Relational Schema              Object Schema
Employee(eid, ename, deptid)    Emp(eid, ename, dept)
Department(did, dname)          Dept(did, dname, empset)

Required Query
    SELECT  E.eid, E.ename, D.did, D.dname
    FROM    Employee E, Department D
    WHERE   E.salary > 10 AND
            E.deptid LEFT JOIN D.did AND D.count > 1000
```

In this example, the condition Emp.Dept.count > 1000 is on the same path as the prefetch hint Emp.Dept. Therefore, we can convert the prefetch hint to a full join. Even then several execution strategies are possible. Two are shown below. The first is used if Emp.Dept is a one-to-one relationship, the second if it is a one-to-many relationship

```
First query plan
    SELECT  E.eid, E.ename, D.did, D.dname
    FROM    Employee E, Department D
    WHERE   E.salary > 10 AND
            E.deptid = D.did AND D.count > 1000

Second query plan (Final merge done in the gateway)
    SELECT  E.eid, E.ename, D.did
    FROM    Employee E, Department D
    WHERE   E.salary > 10 AND
            E.deptid = D.did AND D.count > 1000
    ORDER   BY D.did SELECT  D.did, D.dname
    FROM    Employee E, Department D
    WHERE   E.salary > 10 AND
            E.deptid = D.did AND D.count > 1000
    ORDER   BY D.did
```

FIG. 9

```
Object Query
   Emp[:salary > 10:]

Prefetch Path
   Emp.Dept

Relational Schema              Object Schema
Employee(eid, ename, deptid)    Emp(eid, ename, dept)
Department(did, dname)          Dept(did, dname, empset)

Required Query
   SELECT  E.eid, E.ename, D.did, D.dname
   FROM    Employee E, Department D
   WHERE   E.salary > 10 AND
           E.deptid LEFT JOIN D.did First query plan
   SELECT  E.eid, E.ename
   FROM    Employee E
   WHERE   E.salary > 10 AND
           NOT (E.deptid IN (SELECT E1.deptid FROM Employee E1))

SELECT  E.eid, E.ename, D.did, D.dname
   FROM    Employee E, Department D
   WHERE   E.salary > 10 AND E.deptid = D.did Second query plan (Final merge done in the gateway)
   SELECT  E.eid, E.ename, E.deptid
   FROM    Employee E
   WHERE   E.salary > 10
   ORDER   BY E.deptid SELECT  D.did, D.dname
   FROM    Employee E, Department D
   WHERE   E.salary > 10 AND E.deptid = D.did
   ORDER   BY D.did
```

FIG. 10

```
Object Query
   Emp[:salary > 10:]

Prefetch Path
   Emp.projset

Relational Schema              Object Schema
Employee(eid, ename, salary)   Emp(eid, ename, salary, projset)
Project(pid, pname)            Proj(pid, dname)
Worksin(eid, pid) - intermediate table for projset Required Query
   SELECT  E.eid, E.ename, E.salary, P.pid, P.pname
   FROM    Employee E, Worksin EP, Project P
   WHERE   E.salary > 10 AND
           E.eid LEFT JOIN EP.eid AND EP.pid = P.pid Query Plan 1
   SELECT  E.eid, E.ename, E.salary
   FROM    Employee E
   WHERE   E.salary > 10 AND
           NOT (E.eid IN (SELECT EP.eid FROM Worksin EP))

SELECT  E.eid, E.ename, E.salary, P.pid, P.pname
   FROM    Employee E, Worksin EP, Project P
   WHERE   E.salary > 10 AND E.eid = EP.eid AND EP.pid = P.pid Query Plan 2 (Two merges + sort in gateway)
   SELECT  E.eid, E.ename, E.salary
   FROM    Employee E
   WHERE   E.salary > 10
   ORDER   BY E.eid SELECT  EP.eid, EP.pid
   FROM    Employee E, Worksin EP
   WHERE   E.salary > 10 AND E.eid = EP.eid
   ORDER   BY EP.eid SELECT  P.pid, P.pname
   FROM    Employee E, Worksin EP, Project P
   WHERE   E.salary > 10 AND E.eid = EP.eid AND EP.pid = P.pid
   ORDER   BY P.pid
```

FIG. 11

```
        Object Query                    Prefetch Path
        X[:<Conditionlist>:]            X.Y Relational Schema               Object Schema
Xr(x1, ..., xn, Yfk)                    X(x1, ..., xn, Yptr)
Yr(y1, ..., ym)                         Y(y1, ..., ym, Xptr)
Key(Xr) = x1, Key(Yr) = y1
Rule 1a
    (0,1)-(0,1)relationship
    referential integrity on (Xr.Yfk, Yr.y1)is enforced SELECT   X.x1, ..., X.xn
    FROM     Xr X
    WHERE    <xlated_conditionlist> AND X.Yfk IS NULL SELECT   X.x1, ..., X.xn, Y.y1, ..., Y.ym
    FROM     Xr X, Yr Y
    WHERE    <xlated_conditionlist> AND X.Yfk = Y.y1

Rule 1b
    (0,1)-(0,1)relationship
    referential integrity on (Xr.Yfk, Yr.y1)is NOT enforced SELECT   X.x1, ..., X.xn
    FROM     Xr X
    WHERE    <xlated_conditionlist> AND
             NOT (X.Yfk IN (SELECT Y.y1 FROM Yr Y))

SELECT   X.x1, ..., X.xn, Y.y1, ..., Y.ym
    FROM     Xr X, Yr Y
    WHERE    <xlated_conditionlist> AND X.Yfk = Y.y1

Rule 1c
    (1,1)-(1,1)relationship OR left to natural join transformation

SELECT   X.x1, ..., X.xn, Y.y1, ..., Y.ym
    FROM     Xr X, Yr Y
    WHERE    <xlated_conditionlist> AND X.Yfk = Y.y1
```

FIG. 12

```
    Object: Query
    X[:<Conditionlist>:]

Prefetch Path P1, is executed using left join
    X.Y

Relational Schema              Object Schema
Xr(x1, ..., xn, Yfk)           X(x1, ..., xn, Yptr)
Yr(y1, ..., ym)                Y(y1, ..., ym, Xset)
Key(Xr) = x1, Key(Yr) = y1

Rule 2
    (0,1)-(0,n)relationship OR (1,1)-(1,n)relationship
    referential integrity on (Xr.Yfk, Yr.y1)not enforced SELECT    X.x1, ..., X.xn, X.Yfk
    FROM      Xr X
    WHERE     <xlated_conditionlist>
    ORDER BY  X.Yfk SELECT    Y.y1, ..., Y.ym
    FROM      Xr X, Yr Y
    WHERE     <xlated_conditionlist> AND X.Yfk = Y.y1
    ORDER BY  Y.y1

(Final merge is done in the gateway)
```

FIG. 13

```
Object Query
    X[:<Conditionlist>:]

Prefetch Path P1, is executed using left join
    X.Y

Relational Schema              Object Schema
Xr(x1, ..., xn)                    X(x1, ..., xn, Yset)
Yr(y1, ..., ym)                    Y(y1, ..., ym, Xset)
XYr(Xfk, Yfk) - This is the many-to-many relationship table
Key(Xr) = x1, Key(Yr) = y1

Rule 3
    (0,n)-(0,n)relationship AND (1,n)-(1,n)relationship
    referential integrity on (Xr.Yfk, Yr.y1)not enforced SELECT   X.x1, ..., X.xn
    FROM     Xr X
    WHERE    <xlated_conditionlist>
    ORDER BY X.x1

SELECT   XY.Xfk, XY.Yfk
    FROM     Xr X, XYr XY,
    WHERE    <xlated_conditionlist> AND
             XY.Xfk = X.x1
    ORDER BY XY.Xfk SELECT   Y.y1, ..., Y.ym
    FROM     Xr X, XYr XY, Yr Y
    WHERE    <xlated_conditionist> AND
             XY.Xfk=X.x1 AND XY.Yfk=Y.y1
    ORDER BY Y.y1

(Two merges + a sort will be done in the gateway)
```

FIG. 19

Object Query
   Emp[:salary > 10:]

Prefetch Path
   Emp.projset.empset

Relational Schema
Employee(eid, ename, salary)
Project(pid, pname)
Worksin(eid, pid)

Object Schema
Emp(eid, ename, salary, projset)
Proj(pid, pname, empset)
- many-to-many relationship [projset, empset]

Required Query
```
SELECT  E.eid, E.ename, E.salary, P.pid, P.pname
        E1.eid, E1.ename, E1.salary
FROM    Employee E, Worksin EP, Project P, Worksin PE, Employee E1
WHERE   E.salary > 10 AND
        E.eid LEFT JOIN EP.eid AND EP.pid = P.pid AND
        P.pid LEFT JOIN PE.pid AND PE.eid = E1.eid
```

Query Plan
```
SELECT  E.eid, E.ename, E.salary
FROM    Employee E
WHERE   E.salary > 10
ORDER   BY E.eid SELECT  EP.eid, EP.pid
FROM    Employee E, Worksin EP
WHERE   E.salary > 10 AND E.eid = EP.eid
ORDER   BY EP.eid SELECT  P.pid, P.pname
FROM    Employee E, Worksin EP, Project P
WHERE   E.salary > 10 AND E.eid = EP.eid AND EP.pid = P.pid
ORDER   BY P.pid SELECT  PE.pid, PE.eid
FROM    Employee E, Worksin EP, Project P, Worksin PE
WHERE   E.salary > 10 AND E.eid = EP.eid AND EP.pid = P.pid AND
        P.pid = PE.pid
ORDER   BY PE.eid SELECT  E1.eid, E1.ename, E1.salary
FROM    Employee E, Worksin EP, Project P, Worksin PE, Employee E1
WHERE   E.salary > 10 AND E.eid = EP.eid AND EP.pid = P.pid AND
        P.pid = PE.pid AND PE.eid = E1.eid
ORDER   BY E1.eid
```

SYSTEM AND METHOD FOR GENERATING AN OPTIMIZED SET OF RELATIONAL QUERIES FOR FETCHING DATA FROM A RELATIONAL DATABASE MANAGEMENT SYSTEM IN RESPONSE TO OBJECT QUERIES RECEIVED FROM AN OBJECT ORIENTED ENVIRONMENT

This application is a continuation of application Ser. No. 08/366,238, filed Dec. 29, 1994, now abandoned.

CROSS-REFERENCE TO OTHER APPLICATIONS

The following application of common assignee contains some common disclosure, and is believed to have an effective filing date identical with that of the present application:

U.S. patent application entitled "System and Method for Efficiently Translating Relational Tuples to Object-Oriented Objects", Ser. No. 08/366,541, incorporated herein by reference in its entirety.

TECHNICAL FIELD

The present invention relates generally to databases, and more particularly to generating relational database queries to retrieve data from a relational database in accordance with an object-oriented database query and an associated set of prefetch paths.

BACKGROUND ART

An object-oriented computing environment typically includes an object-oriented database (or multiple object-oriented databases) for storing data according to an object-oriented database schema. The object-oriented database schema specifies the information needed to define the classes and the class hierarchy for the objects stored in the object-oriented database, such as the attributes for each class, the data type of each attribute, etc.

A great amount of data is currently stored in existing relational database management systems (RDBMS), such as DB2 produced by International Business Machines (IBM) Corporation, Oracle produced by Oracle Corp., and Sybase produced by Sybase Inc. It would be desirable if applications operating in object-oriented computing environments could access in an object-oriented manner data in relational database management systems.

There are many problems that must be overcome before such object-oriented access to relational database management systems can be allowed. These problems stem from the fact that data is stored in a relational database according to a relational database schema, whereas (as described above) data is stored in an object-oriented database according to an object-oriented database schema. (The relational database schema specifies the tables in the relational database, the number of columns in each table, the nature of such columns, etc.)

Thus, what is required is a system and method for enabling an object-oriented application to access data in a relational database management system in an object-oriented manner.

DISCLOSURE OF INVENTION

Briefly stated, the present invention is directed to a system and method for processing object-oriented queries so as to retrieve data from a relational database management system (RDBMS). According to the present invention, an object-oriented query and zero or more prefetch paths are received from an object-oriented source (such as an application or user). The prefetch paths identify one or more objects to be prefetched in addition to the objects that are fetched as a result of executing the object-oriented query. The object-oriented query is translated to a translated object query, where the translated object query is a relational database query capable of retrieving from the RDBMS data to initialize base attributes of top-level objects identified by the object-oriented query. A set of relational queries is generated from the translated object query and the prefetch path. These relational queries, which are capable of retrieving from the RDBMS data needed to construct the objects identified by the prefetch path, are processed by the RDBMS.

Further features and advantages of the present invention, as well as the structure and operation of various embodiments of the present invention, are described in detail below with reference to the accompanying drawings. In the drawings, like reference numbers indicate identical or functionally similar elements.

The foregoing and other objects, features and advantages of the invention will be apparent from the following more particular description of (a) preferred embodiment(s) of the invention, as illustrated in the accompanying drawing(s).

BRIEF DESCRIPTION OF DRAWINGS

The present invention will be described with reference to the accompanying drawings, wherein:

FIGS. 5–7, 14–17, 18A, and 18B are flowcharts depicting the operation of the present invention;

FIGS. 8–10 and 19 depict ways in which relational queries can be generated from prefetch path components; and FIGS. 11–13 illustrate preferred rules for generating relational queries from prefetch path components.

BEST MODE FOR CARRYING OUT THE INVENTION

Figure 1:
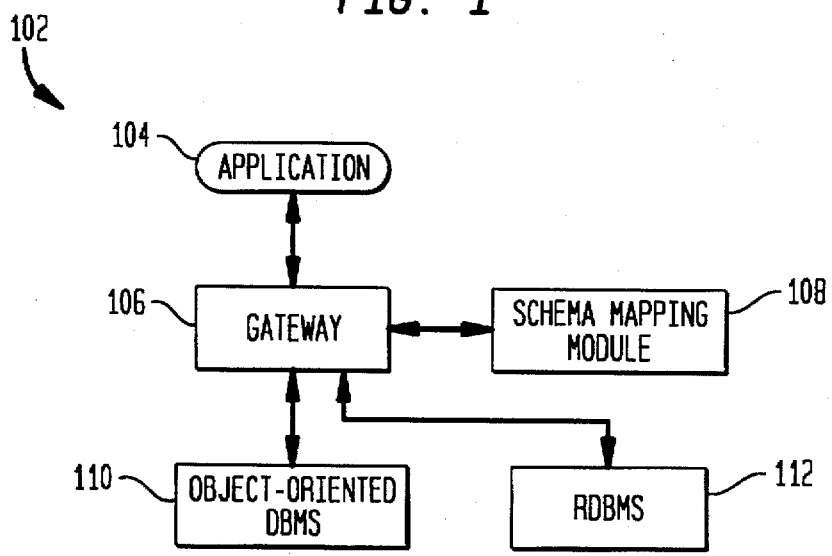
FIG. 1 is a block diagram of an object-oriented computing environment according to a preferred embodiment of the present invention.

FIG. 1 is a block diagram of an object-oriented computing environment 102 according to a preferred embodiment of the present invention. The object-oriented computing environment 102 includes at least one object-oriented database management system (DBMS) 110 which stores data according to an object-oriented database schema. The object-oriented database schema specifies the information needed to define the classes and the class hierarchy for the objects stored in the object-oriented DBMS 110, such as the attributes for each class, the data type of each attribute, etc. A suitable form of the object-oriented DBMS is the "ObjectStore" DBMS produced by Object Design of Burlington, Mass. However, any other commercial object-oriented DBMS is also suitable.

The object-oriented computing environment 102 also includes at least one relational database management system (RDBMS) 112. The RDBMS 112 can also be viewed as existing outside of the object-oriented computing environment 102, but physically connected to components in the object-oriented computing environment 102 (in particular, to a gateway 106). A suitable form of the RDBMS 112 is DB2 produced by IBM, Oracle produced by Oracle Corp., and/or Sybase produced by Sybase Inc.

Object-oriented applications, such as application 104, access the data in the object-oriented DBMS 110. Such access is performed in a well known, object-oriented manner according to a well known object-oriented database interface. The object-oriented database interface is consistent with the object-oriented database schema of the object-oriented DBMS 110.

The present invention also allows the application 104 to access the data in the RDBMS 112 via an object-relational database gateway 106. According to the present invention, the application 104 accesses the RDBMS 112 in an object-oriented manner. It should be understood that, while the invention is described herein in terms of having a relational database management system, the present invention is also adapted for use with other non-object-oriented database management systems, such that these other database management systems can be accessed in an object-oriented manner.

More particularly, the application 104 generates and transfers object-oriented database queries (also called object queries herein) and an (optional) set of prefetch paths associated with the object queries to the gateway 106. The gateway 106 analyzes the object queries and their prefetch paths (if any) and generates, for each object query and its set of prefetch paths, a set of relational database queries (also called relational queries herein). These relational queries are capable of retrieving from the RDBMS 112 the information indicated by the object query (and also indicated by prefetch paths, as discussed below).

Figure 2:
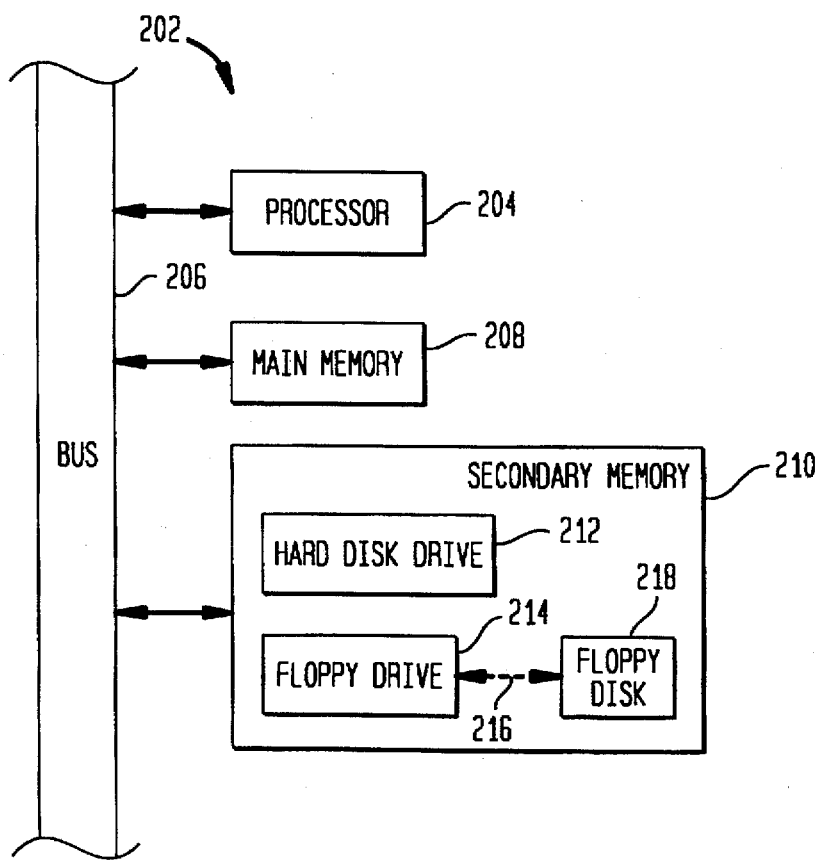
FIG. 2 is a block diagram of a computer system in which the computing environment of FIG. 1 resides.

The object-oriented computing environment 102 preferably exists in a computer system 202 as shown in block diagram form in FIG. 2. The computer system 202 includes one or more processors, such as processor 204, which is connected to a communication bus 206. The computer system 202 also includes a main memory 208, preferably random access memory (RAM), and a secondary memory 210 that includes, for example, a hard disk drive 212 and a floppy disk drive 214.

The application 104, gateway 106, schema mapping module 108 (described below), object-oriented DBMS 110, and RDBMS 112 preferably represent computer programs which reside (during run-time) in the main memory 208, and which are executed by the processors in the computer system 202, such as processor 204. (The data maintained by the object-oriented DBMS 110 and the RDBMS 112 may be stored in the main memory 208 and/or the secondary memory 210. Also, the computer programs associated with the application 104, gateway 106, schema mapping module 108, object-oriented DBMS 110, and RDBMS 112 may be stored in a floppy disk 218 or some other removable storage medium, which is read by the floppy drive 214). The computer system 202 may also be connected to a network. In this case, data may be retrieved from relational tables stored in storage devices in communication with the computer system 202 via the network.

The gateway 106 and the schema mapping module 118, when executed, enable the computer system 202 to perform the features of the present invention as discussed herein. Thus, the gateway 106 and the schema mapping module 118 represent controllers of the computer system 202.

A suitable form of the computer system 202 is the well known RISC System/6000 family of computers produced by IBM. Alternatively, the computer system 202 is the well known System/390 family of computers produced by IBM. It should be understood, however, that other computers could alternatively be used without departing from the scope and spirit of the present invention.

Schema Mapping Module

According to the present invention, the application 104 is enabled to access the RDBMS 112 in an object-oriented manner. In other words, the application 104 works using only an object-oriented view of the relational database schema. All operations initiated by the application 104 which involve the RDBMS 112 are in the object-oriented database schema. However, since the RDBMS 112 stores data according to a relational database schema, there needs to be a mechanism by which the relational data (from the RDBMS 112) is mapped into an equivalent object-oriented schema. In the present invention, this mechanism is represented by the schema mapping module 108.

The schema mapping module 108 maps the relational database schema of the RDBMS 112 into the object-oriented schema associated with the object-oriented DBMS 110. The schema mapping module 108 preferably represents a schema mapping object that is stored persistently and that can be used to access relational data using the object-oriented schema.

Figure 3:
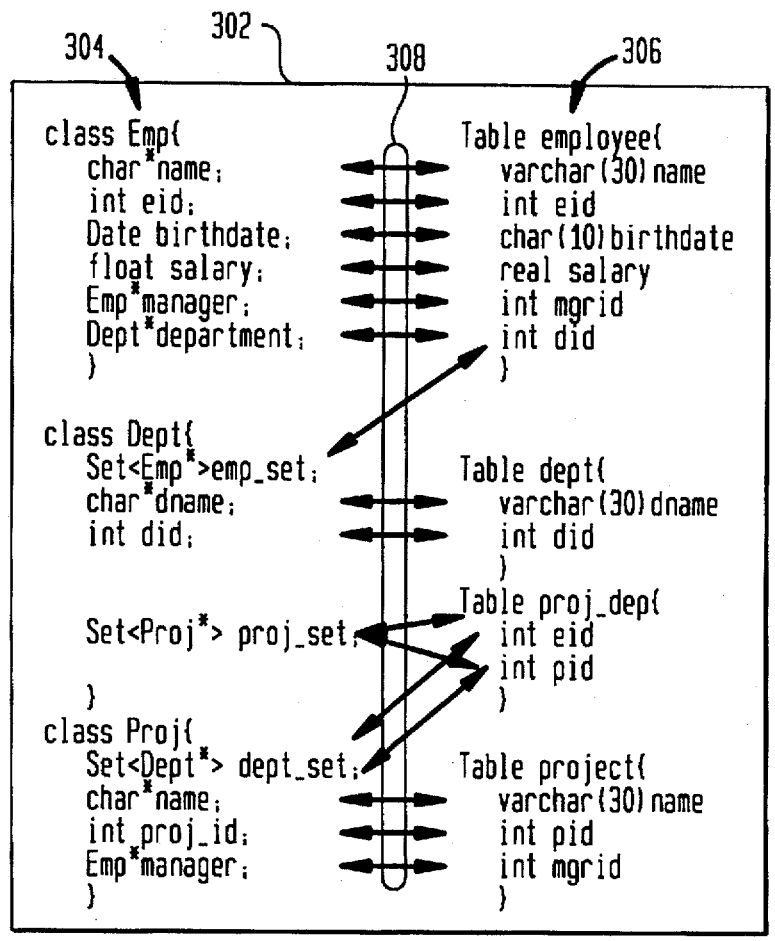
FIG. 3 illustrates an example schema mapping.

An example of a schema mapping is provided in FIG. 3, which shows a representation of an object-oriented database schema 304 and a representation of a relational database schema 306. A schema mapping between the object-oriented database schema 304 and the relational database schema 306 is indicated by arrows 308 (for example, the pointer "name" in the class "Emp" maps to the variable "name" in the table "employee"). Thus, if so queried, the schema mapping module 108 would indicate that the 30 character string variable "name" in the table employee maps to a pointer "name" in the class Emp which points to a character string.

Schema mapping is a well known process. Accordingly, the discussion below focuses on particular characteristics of the schema mapping module 108 which are required to enable operation of the gateway 106. Implementation of the schema mapping module 108 as described herein will be apparent to persons skilled in the relevant art.

According to the present invention, each class is assumed to be mapped to a single relational table or view (although intermediate tables are used to represent many-to-many relationships, as discussed below). Thus, in the example of FIG. 3, class "Emp" maps to table "employee," class "Dept" maps to table "dept," and class "Proj" maps to table "project." An intermediate table "proj_dep" is used to represent the many-to-many relationship involving "proj_set" and "dept_set."

In this scheme, if a class needs to be mapped to multiple tables or views, a new view is created in the relational database which incorporates the definitions of one or more tables or views and the class is subsequently mapped to the newly created view.

Also according to the present invention, every class in the schema mapping is assumed to have two types of attributes, base attributes and relationship (or non-base) attributes. Base attributes are the attributes in a class that do not contain pointers to other objects. Thus, in the example of FIG. 3, with respect to the class "Emp," the following are base attributes: name, eid, birthdate, and salary.

Relationship attributes in a class are the attributes that are not base attributes, namely they are either pointer valued attributes or set valued attributes that contain pointers to other objects. In the example of FIG. 3, with respect to the class "Emp," the following are relationship attributes: manager (which is a pointer to an object of class Emp) and department (which is a pointer to an object of class Dept).

According to the present invention, the schema mapping module 108 can be accessed and queried (by the gateway 106, for example). The schema mapping module 108 can be queried for the following information:

1. Given the name of a class (or a collection), return the following:

(a) The table which corresponds (i.e., maps) to the class, and the set of columns in the corresponding table which map to the base attributes of the class. For example, if the class "Emp" is passed to the schema mapping module 108, then the schema mapping module 108 would return information identifying the following columns of the relational table "employee": name, eid, birthdate, and salary.

(b) The column(s) of the primary key in the table which corresponds to the class. As is well known, a primary key uniquely identifies each row, also called tuple, in a relational table. For example, assume that "eid" is the primary key in the table "employee." If the class "Emp" is passed to the schema mapping module 108, then the schema mapping module 108 would return information identifying the column "eid" of the table employee.

2. Given the name of a relationship in the form of a path expression (a pointer or a set of pointers) (e.g., Emp.department), return the following information:

(a) The member name and arity of the reverse pointer (if one exists) from the target class to the source class. The target class is the class of the object pointed to by the path expression provided to the schema mapping module 108. The source class is the class in which the path expression (i.e., pointer) is contained. In some instances, the target class will contain a pointer that points back to the source class. This is called a reverse pointer. In such cases, the schema mapping module 108 returns the name of this reverse pointer. The schema mapping module 108 also returns the arity of the relationship between the source class and the target class with respect to the reverse pointer (i.e., whether it is one-to-one, one-to-many, many-to-many, or many-to-one).

(b) The foreign key or list of foreign keys (in intermediate tables) in this corresponding relational table that defines the relationship provided to the schema mapping module 108. A foreign key is a value in the corresponding relational table that maps to a non-base attribute in the class. Thus, in table employee of FIG. 3, mgrid and did are foreign keys. If Emp.department is passed to the schema mapping module 108, then the schema mapping module 108 returns "did," which is the foreign key that maps to "department" in the class Emp.

(c) The arity (e.g., one-to-one, one-to-many, many-to-many, many-to-one) of the relationship provided to the schema mapping module 108. Assume that the class Emp includes the following definition:

Emp* spouse;

Also assume that the table employee includes the following definition:

int spouseid;

This represents a one-to-one relationship, since each person (presumably) has a single spouse. Thus, if Emp-.spouse is passed to the schema mapping module 108, the schema mapping module 108 would return an arity of "one-to-one". Now assume that Emp.department is passed to the schema mapping module 108. Each employee has a single department, but each department may contain many employees. This relationship is represented in the class Dept by the set "emp_set" of pointers to Emp objects ("did" is also the foreign key for emp_set). Thus, this represents a "many-to-one " relationship (or, equivalently, a "one-to-many" relationship). Accordingly, the schema mapping module 108 would return an arity of "many-to-one".

(d) The primary key in the table that maps to the owning class. The owning class is the class whose objects are pointed to by the pointer provided to the schema mapping module 108. For example, the owning class of the pointer department in class Emp is "Dept". Table dept maps to class Dept; thus, the schema mapping module 108 returns "did" (assuming that did is the primary key of table dept). The owning class of the pointer manager in class Emp is "Emp". Table employee maps to class Emp; thus, the schema mapping module 108 returns "eid" (assuming that eid is the primary key of table Emp).

Object-Relational Database Gateway

Figure 4:
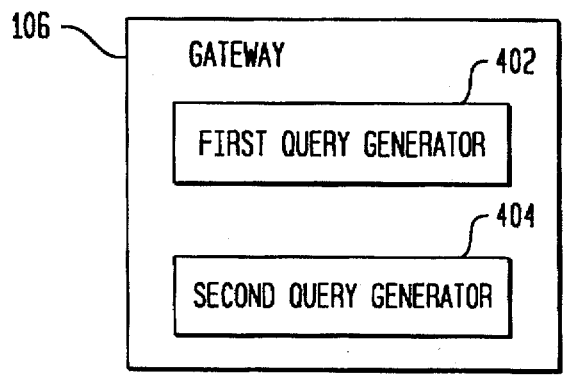
FIG. 4 is a block diagram of a gateway according to a preferred embodiment of the present invention.

FIG. 4 is a block diagram of the gateway 106 according to one embodiment of the present invention. According to this embodiment, the gateway 106 includes a first query generator 402 and a second query generator 404. The first and second query generators 402 and 404 collectively operate to generate a set of relational queries from an object query provided by the application 104 (and from prefetch paths, as discussed below). These relational queries are capable of retrieving from the RDBMS 112 the information indicated by the object query (and also indicated by the prefetch paths).

The first query generator 402 analyzes the object query (issued by the application 104) and generates a relational query that is capable of retrieving from the RDBMS 112 all of the base attributes for the top-level object(s). The top-level objects are defined as the objects which can be constructed using the data that is retrieved from the relational database as a result of executing the object query. In other words, the top-level objects are explicitly identified by the object query. If prefetch paths are specified, additional "prefetch" objects will be retrieved that are related to the top-level objects. The prefetch paths identify these additional prefetch objects. If no prefetch paths are specified, only top-level objects will be retrieved. For example, consider the following example object query (all object queries shown herein are based on the well known ObjectStore Query Language, described in Orenstein et al., "Query Processing in the ObjectStore Database System", Proceedings of the ACM SIGMOD Conference, San Diego, Calif., 403–412, Jun. 1992, incorporated herein by reference).

Employees [: salary>20000:]

This query, which is based on the example classes and tables shown in FIG. 3, operates to retrieve all objects (these are the top-level objects) of class Emp where the salary base attribute is greater than 20,000. The first query generator 402 generates the following relational query from the above object query:

SELECT E.name, E.eid, E.birthdate, E.salary
FROM Employee E
WHERE salary>20000

Note that this relational query operates to retrieve from the RDBMS 112 only the base attributes (i.e., name, eid, birthdate, and salary) for only the top level object. This relational query does not retrieve any information needed to initialize the non-base attributes (such as manager or department). Also, this relational query does not retrieve any attributes (base or otherwise) from any objects other than the top level object. Non-top level objects include, for example, the objects pointed to by the manager and department pointers.

The first query generator 402 generates the above relational query by querying the schema mapping module 108 to determine which table or view is mapped to the class Emp, and to determine which columns of this table map to the base attributes of the class Emp. The relational query is generated directly from this information.

Relational queries are represented herein using well known SQL strings. (As will be appreciated, SQL (structured query language) is a well known database language first produced by International Business Machines (IBM) Corporation.) This high-level representation is used here to simplify the presentation of the algorithms and concepts involved and a real system implementing this algorithm could easily represent relational queries internally using alternate graph structures which are equivalent to SQL statements that have been parsed. The algorithm presented here will work with no changes for internal representations that are not strings.

Prefetch Paths

As is well known, in an object database, it is possible to access other objects from a given object using pointers to the other objects stored as part of the given object. Dereferencing such pointers (that is, setting the values of such non-based "pointer" attributes in the given object when data for the object is read from a database and the given object is initialized) enables access to both base and relationship attributes of the pointed-to objects. The translated object query (generated by the first query generator 402) is capable of retrieving the information needed to construct the base attributes of the given object (the top-level object). More work is needed, however, to initialize other objects pointed to by the relationship attributes in the top-level object.

One way to prefetch objects is to recursively retrieve all objects pointed to by objects that are the result of the top level query. (As used herein, the term "prefetching" refers to the operation of retrieving data from the RDBMS 112, in response to an object query, for the purpose of initializing objects related to objects that form the result of the object query.) This would almost certainly result in major performance problems by fetching too many objects that are not needed by the application.

A second alternative is to not fetch any object except the top-level objects but initialize the pointers using some special values. Dereferencing such special pointers will lead to an interrupt that can be trapped and the object pointed-to can be retrieved at that time. This second solution is called "object faulting" and can also cause performance problems since dereferencing every pointed-to object will cause an SQL query to be generated and executed to retrieve one object. This will also most likely result in low performance.

In the present invention, a third approach is preferably used to prefetch data. According to this third approach, the application 104 (or user) is required to provide zero or more prefetch paths with the object query. If a prefetch path is not provided, then only the base attributes of the top-level objects are initialized. If additional objects need to be prefetched and initialized, then the user must explicitly specify the paths (starting from the top-level objects) leading to those objects. Only the objects along these paths (called the prefetch paths) are fetched and initialized. Other relationship attributes that are not along the specified prefetch paths will have invalid pointers.

Prefetch paths are passed by the user as strings along with the original object query. The first query generator 402 transfers the translated object query as well as the prefetch paths to the second query generator 404. The second query generator 404 uses the translated object query and the prefetch path (as well as information obtained from the schema mapping module 108) to generate relational queries that are capable of retrieving from the RDBMS 112 all data needed to initialized the objects and the attributes indicated by the prefetch paths.

If no prefetch paths are passed, then only the base attributes of the top level objects are returned. Any attempt to dereference the relationship attributes in these objects will result in an exception.

The following information is part of the prefetch path information:

1. Top Level Class: This parameter provides the name of the class being queried. Any information on this class can be obtained by accessing the schema mapping module 108.

2. Prefetch Path Set: A set of path strings specify relationships along a path starting from the top level class. For example, paths starting from Emp class in FIG. 3 include "department.proj_set.dept_set", "proj_set", "manager.manager", "department.emp_set", etc.

Operation of the Present Invention

The operation of the present invention shall now be described in greater detail with reference to a flowchart 502 shown in FIG. 5. Flowchart 502 represents the operation of the gateway 106 while processing an object query issued by the application 104. As discussed above, the application 104 sends zero or more prefetch paths along with the object query to the gateway 106. The flowchart 502 begins with step 504, where control immediately passes to step 506.

In step 506, the gateway 106 receives the object query (also called the original object query) and the prefetch paths, if any, from the application 104.

In step 508, the gateway 106 analyzes the object query and determines whether the object query is intended to access data in the object-oriented DBMS 110 only, or whether the object query is intended to access data in the RDBMS 112. The gateway 106 may do this, for example, by providing the class being queried to the schema mapping module 108. If the schema mapping module 108 returns information identifying a corresponding table, then the gateway 106 concludes that the object query is intended to access data in the RDBMS 112. Otherwise, the gateway 106 concludes that the object query is intended to access data only in the object DBMS 110. The gateway 106 can alternatively perform step 508 by requiring the application 104 (or the user) to call a special query module that is restricted to executing object queries on only relational DBMS data. All classes that are part of such an object query are assumed to be mapped to relational database data and if that is not the case an error is generated.

If the gateway 106 concludes that the object query is intended to access data only in the object DBMS 110, then step 510 is performed. In step 510, the gateway 106 passes the object query to the object DBMS 110. The object DBMS 110 processes the object query in a well known manner. Flowchart 502 is complete after step 510 is performed, as indicated by step 518.

If, in step 508, the gateway 106 concludes instead that the object query is intended to access data in the RDBMS 112, then step 512 is performed. In step 512, the first query generator 402 generates a translated object query from the original object query. The translated object query is capable of retrieving from the RDBMS 112 the information needed to construct the base attributes of the top-level object. The manner in which the first query generator 402 generates the translated object query is discussed above. The first query generator 402 passes the translated object query and the prefetch path(s), if any, to the second query generator 404.

In step 514, the second query generator 404 translates the prefetch paths (if any), which are in object-oriented form, to a nested representation of prefetch paths, still in object-oriented from. The second query generator 404 then analyzes the translated object query and the nested representation of prefetch path(s) and generates a set of relational queries for accessing the RDBMS 112. These relational queries are capable of retrieving from the RDBMS 112 information needed to construct objects specified in the prefetch path(s). The manner in which the second query generator 404 generates this set of relational queries is discussed below.

In step 516, the second query generator 404 passes the relational queries (generated in step 514) to the RDBMS 112. The RDBMS 112 processes the relational queries in a well known manner, and returns to the second query generator 404 the data that was retrieved by operation of the relational queries. The second query generator 404 (or some other component of the gateway 106) then merges the data, as needed. The merging operation is discussed below. This retrieved (and possibly merged) data is sufficient to enable the gateway 106 to construct the top-level object, and the other objects identified by the prefetch path(s), if any. The manner in which the second query generator 404 constructs these objects in accordance with this retrieved data is described in the above-referenced U.S. patent application entitled "System and Method for Efficiently Translating Relational Tuples to Object-Oriented Objects", Attorney Docket No. ST8-94-0051/1252.1720000, incorporated herein by reference in its entirety.

It is noted that, if no prefetch paths were passed to the second query generator 404, then in step 514 the second query generator 404 simply passes the translated object query to the RDBMS 112. In step 516, the RDBMS 112 processes the translated object query and transfers the retrieved data to the second query generator 404. The gateway 106 then uses this data to construct the top-level objects.

Flowchart 502 is complete after step 516 is performed, as indicated by step 518.

Second Query Generator

As discussed above, in step 514 the second query generator 404 uses the translated object query and the prefetch paths to produce a set of one or more relational queries that will fetch from the RDBMS 112 the relevant data needed to construct objects in the prefetch paths (in addition to the top-level objects). In practice, the process of generating these relational queries is driven by various factors like the availability of the outer join operator, the possibility of translating prefetch paths to a natural join as opposed to the default left outer join, and the types of relationships (one-to-one, one-to-many, many-to-many) that are implied along the prefetch paths.

The manner in which the second query generator 404 generates these relational queries from the translated object query and the prefetch paths shall now be described with reference to flowchart 602 shown in FIG. 6. (It is assumed in this discussion that one or more prefetch paths exist. The operation of the second query generator 404 when the application 104 or user did not transfer any prefetch paths to the first query generator 402 (in step 506, FIG. 5) is described above.) Flowchart 602 begins with step 604, where control immediately passes to step 606.

In step 606, the second query generator 404 analyzes the prefetch paths and collapses them into a recursive representation (called the nested prefetch structure or nested prefetch path representation) that eliminates duplicates and nests them such that each component in each prefetch path only appears once. The root of this nested prefetch structure is the top level class. By generating the nested prefetch structure, the operation of the second query generator 404 in step 608 is facilitated.

For example, suppose that the top-level class is "Emp", and the prefetch paths include the following: "department", "department.proj_set", and "department.emp_set". In this example, the nested prefetch structure would be as follows:

[department, {[proj_set, { }], [emp_set, { }]}]

The manner in which the second query generator 404 performs step 606 is as follows. The nested path representation of a prefetch path has two attributes, namely, the attribute or class where the path starts and a set of sub_paths that are within it. All nested paths for a set of prefetch paths start from the top-level class. The algorithm to create a nested path representation for a set of prefetch paths is as follows:

1. A nested path object, path_root, is created to represent the nested-path representation for all of the paths rooted at the class of the root-level objects. The class attribute of path_root is set to be the name of the top-level class. The sub_paths set of the path_root is initialized to the empty set.

2. For each prefetch path starting from the top-level class, do steps 3 and 4.

Step 3. Set current_path to be the path_root. Set current_step to be the first step in the current prefetch path (e.g., the prefetch path department.emp_set has two steps, the first being "department" and the second being "emp_set".).

Step 4. If a nested path exists in the sub_paths set of the current_path whose attribute value matches the current_step, then do step 4a, otherwise do step 4b.

Step 4a. Set the current_path to the matching nested path. If current_step is the last step, then proceed to step 2 and process the next prefetch path. Otherwise, set current_step to be the next step in the prefetch path, and repeat step 4.

Step 4b. Create a new nested path whose attribute value matches the current_step. Add this new nested path to the sub_paths set of the current_path. Set the current_path to the new nested path. If current_step is the last step, then proceed to step 2 and process the next prefetch path. Otherwise, set current_step to be the last step in the prefetch path, and repeat step 4.

The path_root contains the nested prefetch representation at the end of the above algorithm.

In step 608, the second query generator 404 traverses the nested prefetch structure and generates the relational queries using schema mapping information obtained by appropriately querying the schema mapping module 108. In order to generate these relational queries, it is necessary to follow a number of rules (developed by the inventor). Which rule is followed depends on whether the prefetch paths contain one-to-one, one-to-many, or many-to-many relationships. The operation of the second query generator 404 while performing step 608 is described in the following section.

Generatinq Relational Queries from the Prefetch Path(s) (Step 608 of FIG. 6)

According to the present invention, the second query generator 404 translates each component of each prefetch path into one or more relational queries. The inventor has recognized that each component of each prefetch path can be evaluated using a well known left outer join operation (also called left join or outer join). Thus, the relational queries for each component of each prefetch path can be cascaded with all of the conditions and join terms on all queries to the left of the prefetch path component. In some cases, it is possible to combine the queries to create a more efficient set of relational queries. The manner in which these relational queries are generated shall be described by first considering a few examples.

FIG. 8 specifies an example schema mapping, an object query, and a prefetch path on the schema. In this case, there is a condition Dept[:count>1000:] as well as a prefetch path on Emp.Dept. Since the path Emp.Dept occurs both in a condition as well as the prefetch path, it is clear that every Emp object that is the result of the query will necessarily have an associated Dept object.

We can therefore generate the relational query (which is equivalent to the object query) using a well known natural join (in other words, it is possible to avoid using a left join operation). The first query plan shown in FIG. 8 is the solution, and is also the optimal solution, if the Emp.Dept relationship is (1,1)—(1,1), that is, each Emp object is associated with one Dept object. The notation (m,n) is well known in the relevant art and indicates that there must be a minimum of m and a maximum of n. According to this first query plan, the values in columns eid, ename, did, and dname are retrieved from tables Employee E and Department D for those rows in these tables where E.salary is greater than 10, D.count is greater than 1000, and E.deptid is the same as D.did. (It is noted that the query plans discussed herein are presented using the well known SQL syntax. Thus, the meaning and operation of these query plans will be apparent to persons skilled in the relevant art.)

However, if there are multiple Emp objects associated with a Dept object (one-to-many), the first query plan of FIG. 8 will retrieve the same Dept data many times from the RDBMS 112. This is inefficient. In the case of one-to-many relationships, therefore, it is better (in most cases) to perform two queries on the RDBMS 112, a first which retrieves the tuples corresponding to the Emp objects, and a second which retrieves the tuples corresponding to the Dept objects that relate to the Emp objects chosen. This is indicated by the second query plan of FIG. 8.

Note that the first and second queries retrieve the primary key of Department (D.did). These two streams are sorted by the join attribute (D.did) using the well known ORDER BY operation and the final merge is done in the gateway 106. This merge, which operates to match Employee tuple data with corresponding department tuple data (i.e., a particular person's department information is merged with the person's employee information), is facilitated since both streams have been sorted by D.did. Note that, with this second query plan shown in FIG. 8, it is still possible to avoid the use of a left join since, in this example, the condition Dept[:count>1000:] and the prefetch path are both on Emp.Dept.

Let us now consider a case where a left join cannot be avoided. An example is given in FIG. 9. In this example, unlike in the earlier case of FIG. 8, we cannot convert the left join to a natural join, because a natural join will only retrieve Employee tuples that have an associated Department tuple. However, the answer to the object query in FIG. 9 (i.e., Emp[:salary>10:]) could include Employee objects that do not have any associated Department objects. Therefore, a left outer join must be used here.

It is assumed that left join support is not available in the RDBMS. Furthermore, even if left join support is available in the RDBMS, executing the left join directly will result in duplicate data retrieval for one-to-many and many-to-many relationships and hence is not desirable to use it in those cases. So, the only case where a native left join may be used is the one-to-one case. In other cases, it is necessary to represent the object query using two relational, non-left join queries. Two possible query plans, each comprising two queries, are shown in FIG. 9. In both the first and second query plans of FIG. 9, each Employee tuple is retrieved exactly once. While each Department tuple is retrieved exactly once in the second query plan of FIG. 9, this is not the case in the first query plan of FIG. 9 if the Emp.Dept relationship is one-to-many. Therefore, the first query plan is suitable if the Emp.Dept is a one-to-one relationship and the second query plan is suitable if Emp.Dept is a one-to-many relationship. Note that in the second plan, the final merge to find the related Employee and Department tuples is done in the gateway 106.

The query plans used in the previous examples (FIGS. 8 and 9) can be used for many-to-many relationships also, but they might be inefficient since they could retrieve the same tuple multiple times. An example of a many-to-many relationship and more optimal query plans are given in FIG. 10. In the case of a many-to-many relationship, an intermediate table is involved in the join. In this example, two query plans are shown. The first plan shows the simplest way to do the left join and is likely to be inefficient for the many-to-many relationship case discussed here since it could get the same Employee and Project tuples multiple times. The second query plan contains three queries and is very efficient in terms of data retrieval even though it results in two merges and also a sort of the intermediate tables's tuples in the gateway 106.

Keeping in mind the tradeoffs discussed above, the inventor has developed a set of rules for generating query plans for various types of relationships. As should be clear from the discussion above, these query plans represent different ways that the second query generator 404 generates the set of relational queries for a prefetch path component. In this embodiment of the invention, the query plans were developed according to the following principle: choose the most efficient query plan from among those that will retrieve each copy of a tuple at most once. Other rules could alternatively have been developed if other principles/goals were employed. The development of such other rules in light of such other principles/goals will be apparent to persons skilled in the relevant art based on the discussion contained herein.

The inventor has defined three rules for one-to-one relationships (given in FIG. 11), and one rule each for one-to-many (given in FIG. 12) and many-to-many (given in FIG. 13) relationships. These rules have been optimized in such a way that the minimum number of tuples are retrieved from the RDBMS 112. Also, the query plans chosen would have been different if the inventor had decided to minimize the number of relational queries rather than minimizing duplicate data retrieval.

Figure 7:
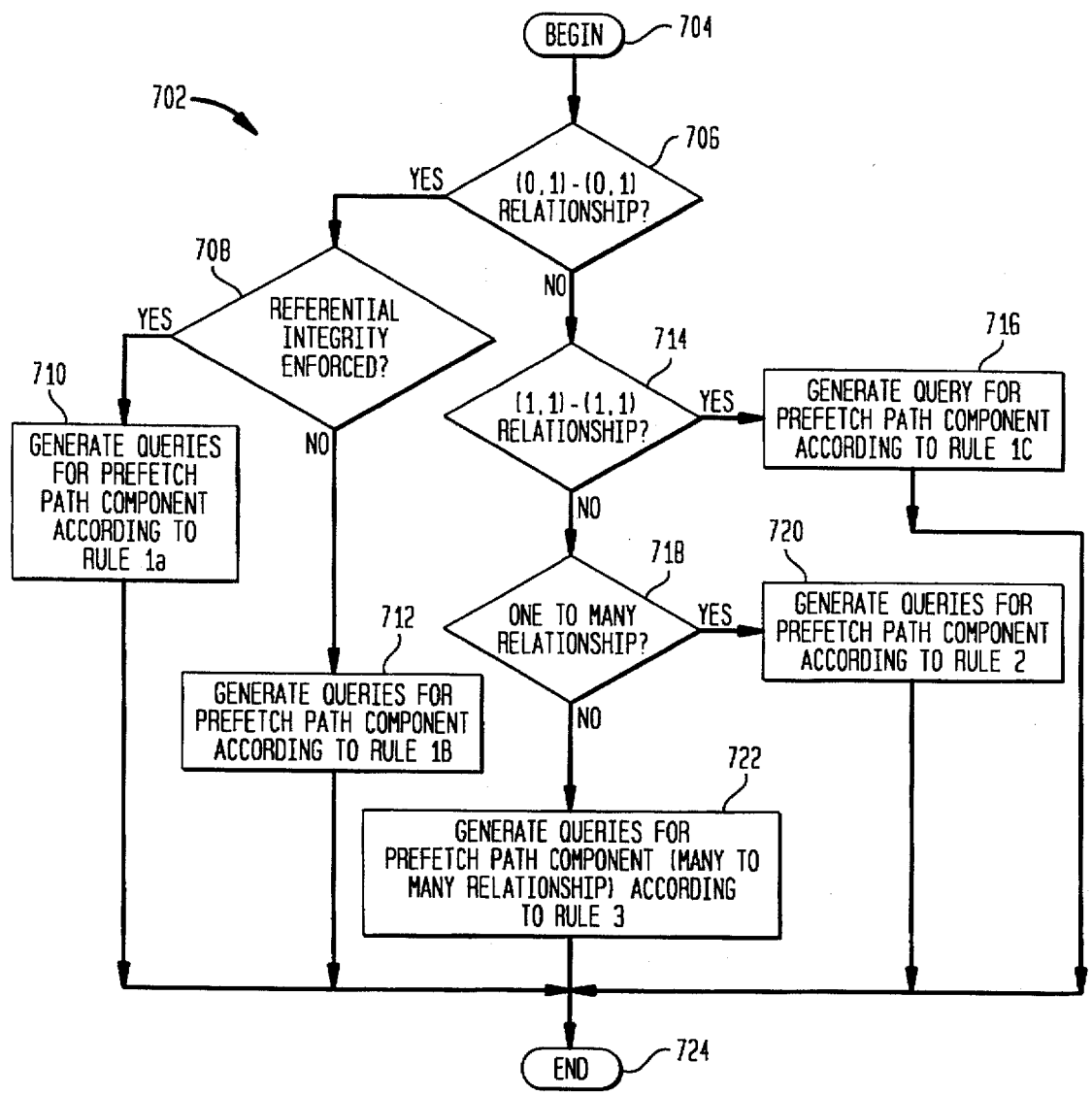

The nature of these rules, and the manner in which these rules are applied by the second query generator 404, shall now be described with reference to a flowchart 702 contained in FIG. 7. This flowchart 702 represents the manner in which the second query generator 404 translates a prefetch path component into one or more relational queries. In other words, flowchart 702 represents the manner in which the second query generator 404 performs step 608 of FIG. 6 (for one prefetch path component). Flowchart 702 begins with step 704, where control immediately passes to step 706.

In step 706, the second query generator 404 determines whether the relationship defined by the prefetch path component is a (0,1)-to-(0,1) relationship. The second query generator 404 does this by querying the schema mapping module 108 to obtain arity information. Given the prefetch path information, the schema mapping module 108 has the ability to provide information regarding foreign keys associated with a relationship as well as information on whether the type of a prefetch component is a single pointer or a set of pointers. The arity can be inferred by looking at the foreign key and type information for the prefetch component.

If the second query generator 404 determines that the prefetch path component defines a (0,1)-to-(0,1) relationship, then step 708 is performed.

In step 708, the second query generator 404 determines whether referential integrity is enforced. Referential integrity is defined as the mechanism by which a DBMS system maintains integrity of the relationships between foreign keys and primary keys, i.e., no dangling references are allowed to exist. All foreign keys will therefore point to valid primary keys if referential integrity is automatically maintained by the system. The second query generator 404 performs step 708 by appropriately querying the schema mapping module 108. If the second query generator 404 determines that referential integrity is enforced, then step 710 is performed.

In step 710, the second query generator 404 generates relational queries corresponding to the prefetch path component according to a Rule 1a. The form of the resulting relational queries for a given object query, a prefetch path, a relational schema, and an object schema is shown in FIG. 11. As indicated by FIG. 11, the second query generator 404 generates a first relational query and a second relational query according to Rule 1a (the second query is shown as being below the first query). The first query operates to retrieve from the RDBMS 112 data to construct objects of the top-level class which are not related to (i.e., which do not point to) objects along the prefetch path, and which satisfy the conditions present in the original object query. The second query operates to retrieve from the RDBMS 112 data to construct objects of the top-level class which are related to (i.e., which point to) objects along the prefetch path, and which satisfy the conditions present in the original object query. The second query also operates to retrieve from the RDBMS 112 data to construct these objects along the prefetch path.

Figure 14:
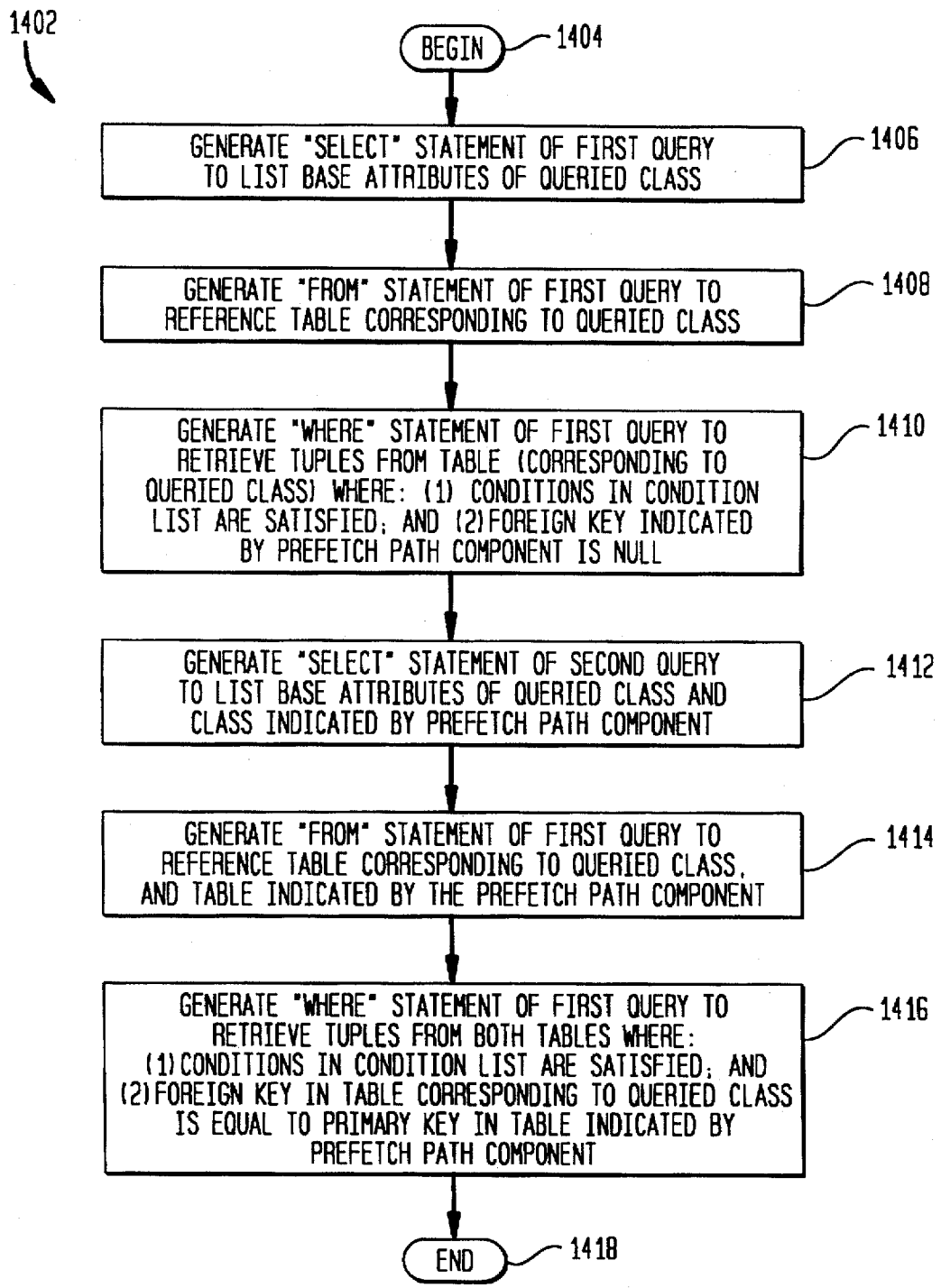

The manner in which the second query generator 404 generates relational queries in accordance with Rule 1a shall now be described with reference to a flowchart 1402 in FIG. 14. Flowchart 1402 begins with step 1404, where control immediately passes to step 1406.

In step 1406, the second query generator 404 queries the schema mapping module 108 to identify the table in the RE)BMS 112 that maps to the queried class (also called the top-level class). For reference purposes, this is called the top-level table. In the example of FIG. 11, the queried class is "X", and the corresponding, top-level table is Xr. Also in step 1406, the second query generator 404 queries the schema mapping module 108 to identify the columns of the top-level table which map to the base attributes in the queried class. Further in step 1406, the second query generator 404 generates the "select" statement of the first query such that this "select" statement lists the columns of the top-level table which map to the base attributes in the queried class.

In step 1408, the second query generator 404 generates the "from" statement of the first query so that this "from" statement references the top-level table.

In step 1410, the second query generator 404 generates the "where" statement of the first query so that this "where" statement operates to retrieve tuples of the top-level table where (1) the condition list (as specified in the translated object query) are satisfied; and (2) the foreign key in the top-level table associated with the table indicated by the prefetch path component is null. In the example of FIG. 11, class Y lies along the prefetch path component "X.Y". Class Y maps to table Yr. Thus, table Yr is indicated by the prefetch path component X.Y. The top-level table, Xr, includes a foreign key Yfk which is associated with table Yr. Thus, this second condition specifies that tuples having Yfk equal to null are retrieved from table Xr (subject to the first condition).

For reference purposes, the class that lies along the prefetch path (i.e., class Y in the example of FIG. 11) is called the prefetch class. The table that maps to the prefetch class (i.e., class Yr in the example of FIG. 11) is called the prefetch table.

In step 1412, the second query generator 404 generates the "select" statement for the second query such that this "select" statement lists the columns of the top-level table which map to the base attributes in the queried class, and also lists the columns of the prefetch table which map to the base attributes in the prefetch class. The second query generator 404 may query the schema mapping module 108 to obtain schema mapping information to perform step 1412.

In step 1414, the second query generator 404 generates the "from" statement of the second query so that this "from" statement references the top-level table and the prefetch table.

In step 1416, the second query generator 404 generates the "where" statement of the second query so that this "where" statement operates to retrieve tuples of the top-level table and the prefetch table where (1) the condition list (as specified in the translated object query) are satisfied; and (2) the pertinent foreign key in the top-level table is equal to the primary key in the pref etch table. The "pertinent foreign key" is the foreign key that is associated with the prefetch table. Thus, in the example of FIG. 11, this pertinent foreign key is equal to Yfk. The primary key in the prefetch table Yr is assumed to be y1. Thus, this second condition specifies that tuples having Yfk equal to y1 are retrieved from tables Xr and Yr (subject to the first condition).

Flowchart 1402 is complete after step 1416 is performed, as indicated by step 1418.

Referring again to FIG. 7, if in step 708 the second query generator 404 determined that referential integrity is not enforced, then step 712 is performed. In step 712, the second query generator 404 generates relational queries corresponding to the prefetch path component according to a Rule 1b. The form of the resulting relational queries for a given object query, a prefetch path, a relational schema, and an object schema is shown in FIG. 11. An example of Rule 1b is discussed above as the first query plan in FIG. 9. As indicated by FIG. 11, the second query generator 404 generates a first relational query and a second relational query according to Rule 1b (the second query is shown as being below the first query). The first query operates to retrieve from the RDBMS 112 data to construct objects of the top-level class which are not related to (i.e., which do not point to) objects along the prefetch path, and which satisfy the conditions contained in the original object query. The second query operates to retrieve from the RDBMS 112 data to construct objects of the top-level class which are related to (i.e., which point to) objects along the prefetch path, and which satisfy the conditions contained in the original object query. The second query also operates to retrieve from the RDBMS 112 data to construct these objects along the prefetch path.

Figure 15:
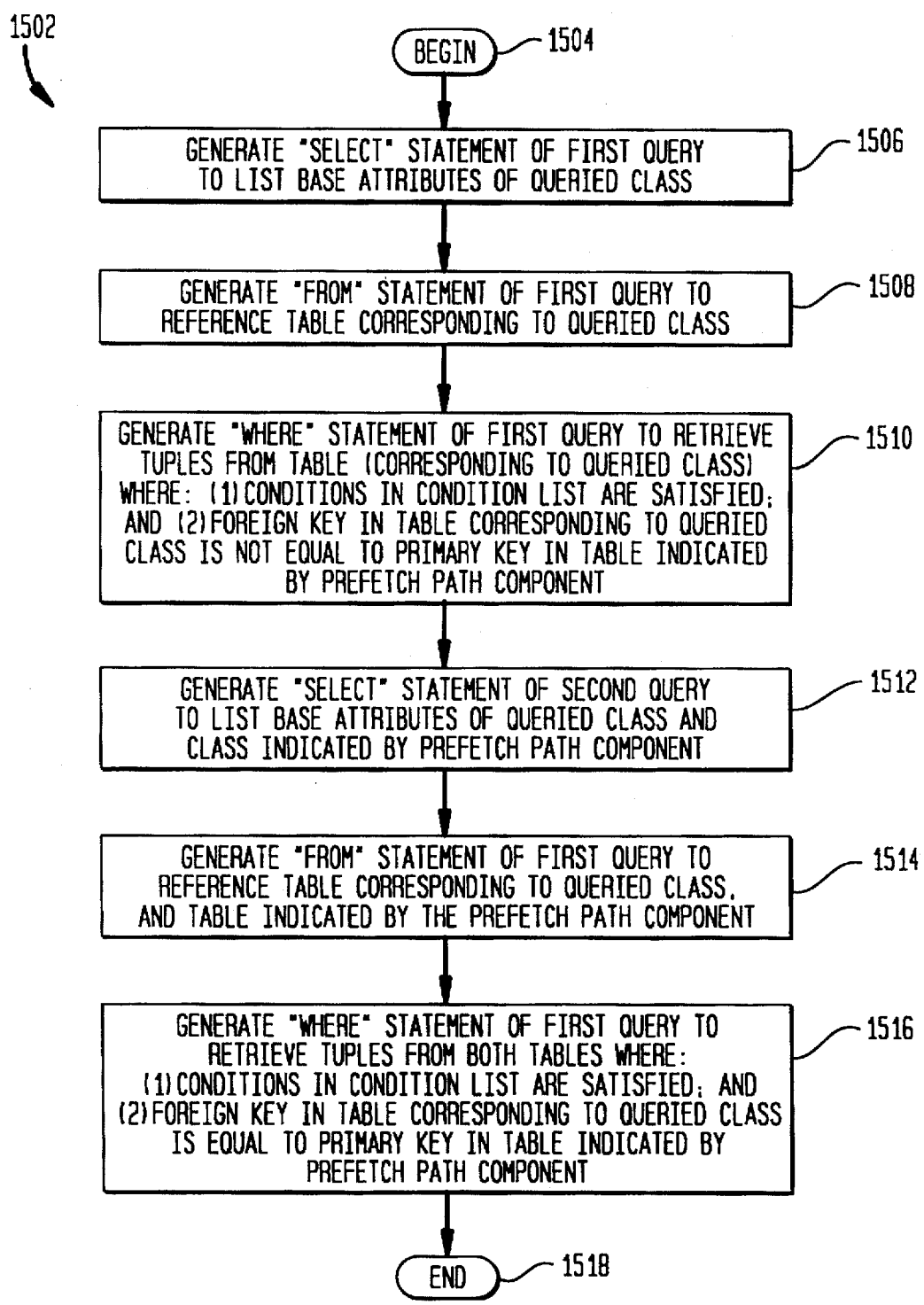

The manner in which the second query generator 404 generates relational queries in accordance with Rule 1b shall now be described with reference to a flowchart 1502 in FIG. 15. Flowchart 1502 begins with step 1504, where control immediately passes to step 1506.

In step 1506, the second query generator 404 generates the "select" statement of the first query such that this "select" statement lists the columns of the top-level table which map to the base attributes in the queried class. The second query generator 404 may query the schema mapping module 108 to obtain schema mapping information to perform step 1506. The performance of step 1506 is similar to the performance of step 1406, described above.

In step 1508, the second query generator 404 generates the "from" statement of the first query so that this "from" statement references the top-level table. The performance of step 1508 is similar to the performance of step 1408, described above.

In step 1510, the second query generator 404 generates the "where" statement of the first query so that this "where" statement operates to retrieve tuples of the top-level table where (1) the condition list (as specified in the translated object query) are satisfied; and (2) the foreign key in the top-level table associated with the prefetch table is not equal to the primary key in the prefetch table. The prefetch table is Yr, and Yfk is the foreign key in the top-level table Xr which is associated with this prefetch table Yr. It is assumed that the primary key in the prefetch table Yr is y1. Thus, this second condition specifies that tuples having Yfk not equal to any y1 are retrieved from table Xr (subject to the first condition).

In step 1512, the second query generator 404 generates the "select" statement for the second query such that this "select" statement lists the columns of the top-level table which map to the base attributes in the queried class, and also lists the columns of the prefetch table which map to the base attributes in the prefetch class. The second query generator 404 may query the schema mapping module 108 to obtain schema mapping information to perform step 1512.

In step 1514, the second query generator 404 generates the "from" statement of the second query so that this "from" statement references the top-level table and the prefetch table.

In step 1516, the second query generator 404 generates the "where" statement of the second query so that this "where" statement operates to retrieve tuples of the top-level table and the prefetch table where (1) the condition list (as specified in the translated object query) are satisfied; and (2) the pertinent foreign key in the top-level table is equal to the primary key in the prefetch table. The "pertinent foreign key" is the foreign key that is associated with the prefetch table. Thus, in the example of FIG. 11, this pertinent foreign key is equal to Yfk. The primary key in the prefetch table Yr is assumed to be y1. Thus, this second condition specifies that tuples having Yfk equal to y1 are retrieved from tables Xr and Yr (subject to the first condition).

Flowchart 1502 is complete after step 1516 is performed, as indicated by step 1518.

Referring again to FIG. 7, if in step 706 the second query generator 404 determines that the relationship defined by the prefetch path component is not a (0,1)-to-(0,1) relationship, then step 714 is performed. In step 714, the second query generator 404 determines whether the relationship defined by the prefetch path component is a (1,1)-to-(1,1) relationship. The operation of step 714 is similar to the operation of step 706. If the second query generator 404 determines that the prefetch path component defines a (1,1)-to-(1,1) relationship, then step 716 is performed.

In step 716, the second query generator 404 generates relational queries corresponding to the prefetch path component according to a Rule 1c. The form of the resulting relational queries for a given object query, a prefetch path, a relational schema, and an object schema is shown in FIG. 11. An example of Rule 1c is presented in FIG. 8 as the first query plan. As indicated by FIG. 11, the second query generator 404 generates a single relational query according to Rule 1c. This query operates to retrieve from the RDBMS 112 data to construct objects of the top-level class which point to objects along the prefetch path, and to construct these objects along the prefetch path.

Figure 16:
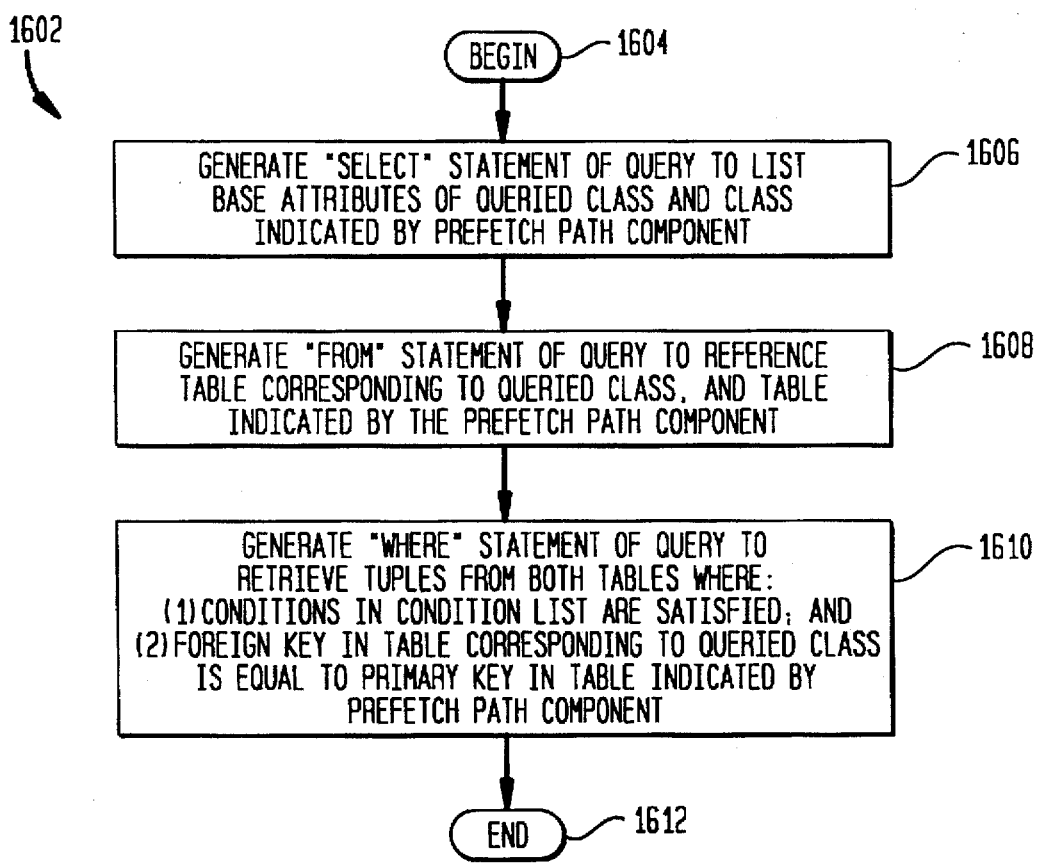

The manner in which the second query generator 404 generates relational queries in accordance with Rule 1c shall now be described with reference to a flowchart 1602 in FIG. 16. Flowchart 1602 begins with step 1604, where control immediately passes to step 1606.

In step 1606, the second query generator 404 generates the "select" statement of the query such that this "select" statement lists the columns of the top-level table which map to the base attributes in the queried class, and the columns of the prefetch table which map to the base attributes of the prefetch class. The second query generator 404 may query the schema mapping module 108 to obtain schema mapping information to perform step 1606.

In step 1608, the second query generator 404 generates the "from" statement of the query so that this "from" statement references the top-level table and the prefetch table.

In step 1610, the second query generator 404 generates the "where" statement of the query so that this "where" statement operates to retrieve tuples of the top-level table and the prefetch table where (1) the condition list (as specified in the translated object query) are satisfied; and (2) the pertinent foreign key in the top-level table is equal to the primary key in the prefetch table. The "pertinent foreign key" is the foreign key that is associated with the prefetch table. Thus, in the example of FIG. 11, this pertinent foreign key is equal to Yfk. The primary key in the prefetch table Yr is assumed to be y1. Thus, this second condition specifies that tuples having Yfk equal to y1 are retrieved from tables Xr and Yr (subject to the first condition).

Flowchart 1602 is complete after step 1610 is performed, as indicated by step 1612.

Referring again to FIG. 7, if in step 714 the second query generator 404 determines that the relationship defined by the prefetch path component is not a (1,1)-to-(1,1) relationship, then step 718 is performed. In step 718, the second query generator 404 determines whether the relationship defined by the prefetch path component is a one-to-many relationship. The operation of step 718 is similar to the operation of steps 706 and 714. If the second query generator 404 determines that the prefetch path component defines a one-to-many relationship, then step 720 is performed.

In step 720, the second query generator 404 generates relational queries corresponding to the prefetch path component according to a Rule 2. The form of the resulting relational queries for a given object query, a prefetch path, a relational schema, and an object schema is shown in FIG. 12. An example of Rule 2 is presented in FIG. 9 as the second query plan.

As indicated by FIG. 12, the second query generator 404 generates a first relational query and a second relational query according to Rule 2 (the second query is shown as being below the first query). The first query operates to retrieve from the RDBMS 112 data to construct objects of the top-level class that satisfy the conditions present in the original object query. The tuples that are retrieved by the first query are sorted according to the foreign key in the top-level table that is related to (i.e., that identifies tuples in) the prefetch table. The second query operates to retrieve from the RDBMS 112 data to construct objects that are along the prefetch path and that are related to (i.e., pointed to by) the top-level objects obtained by the first query. The tuples that are retrieved by the second query are sorted according to the primary key of the prefetch table. The gateway 106 merges the tuples retrieved by the first and second queries.

Figure 17:
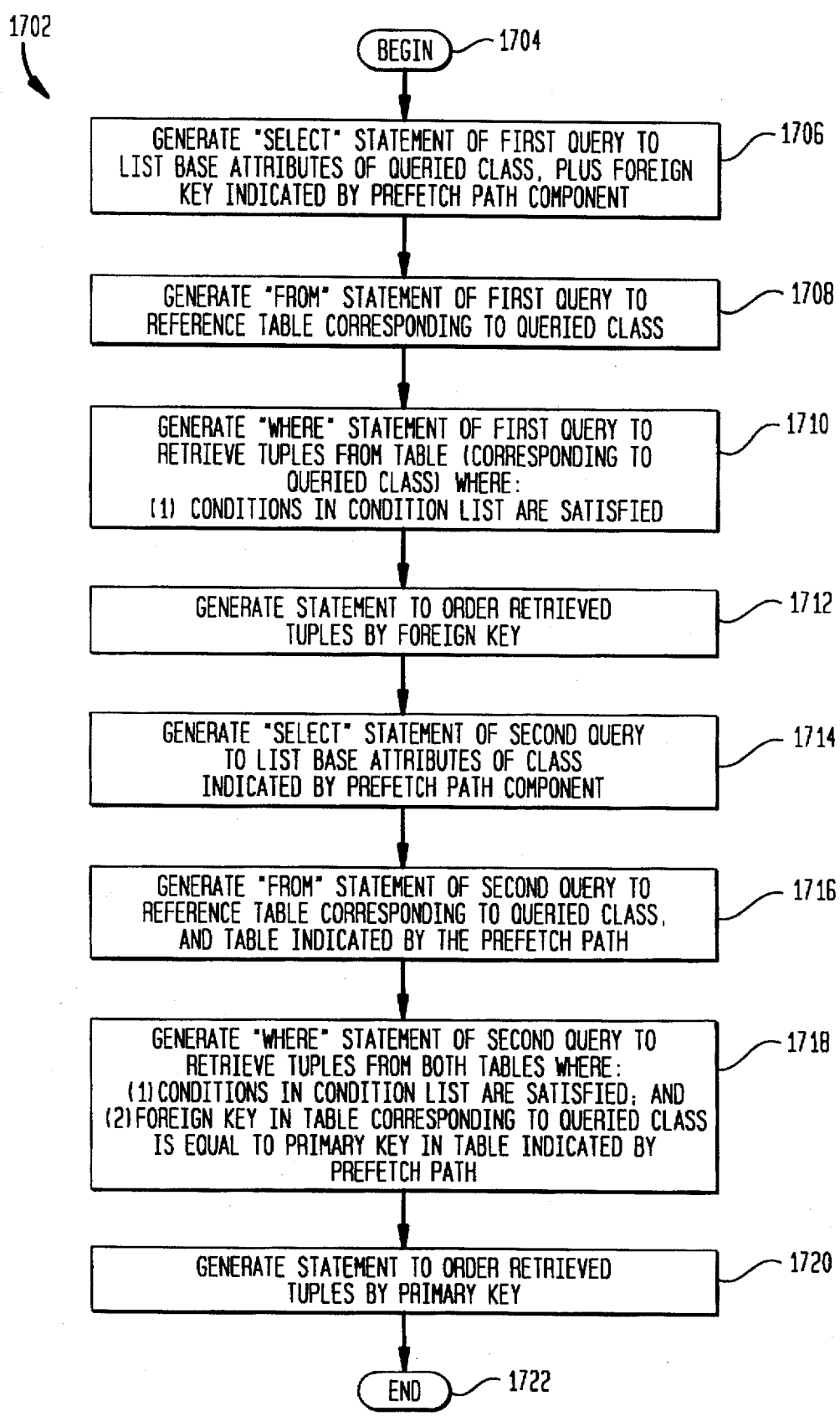

The manner in which the second query generator 404 generates relational queries in accordance with Rule 2 shall now be described with reference to a flowchart 1702 in FIG. 17. Flowchart 1702 begins with step 1704, where control immediately passes to step 1706.

In step 1706, the second query generator 404 generates the "select" statement of the first query such that this "select" statement lists the columns of the top-level table which map to the base attributes in the queried class, and also lists the foreign key in the top-level table associated with the prefetch table. The second query generator 404 queries the schema mapping module 108 to obtain schema mapping information to perform step 1706.

In step 1708, the second query generator 404 generates the "from" statement of the first query so that this "from" statement references the top-level table.

In step 1710, the second query generator 404 generates the "where" statement of the first query so that this "where" statement operates to retrieve tuples of the top-level table where the conditions related to the queried class (and specified in the translated object query) are satisfied.

In step 1712, the second query generator 404 generates an "order by" statement to order the tuples retrieved from the top-level table by the foreign key described above (with respect to step 1706).

In step 1714, the second query generator 404 generates the "select" statement for the second query such that this "select" statement lists the columns of the prefetch table which map to the base attributes in the prefetch class. The second query generator 404 may query the schema mapping module 108 to obtain schema mapping information to perform step 1714.

In step 1716, the second query generator 404 generates the "from" statement of the second query so that this "from" statement references the top-level table and the prefetch table.

In step 1718, the second query generator 404 generates the "where" statement of the second query so that this "where" statement operates to retrieve tuples of the prefetch table where (1) the condition list (as specified in the translated object query) are satisfied; and (2) the pertinent foreign key in the top-level table is equal to the primary key in the prefetch table. The "pertinent foreign key" is the foreign key that is associated with the prefetch table. Thus, in the example of FIG. 12, this pertinent foreign key is equal to Yfk. The primary key in the prefetch table Yr is assumed to be y1. Thus, this second condition specifies that tuples having Yfk equal to y1 are retrieved from table Yr (subject to the first condition).

In step 1720, the second query generator 404 generates an "order by" statement to order the tuples retrieved from the prefetch table by the primary key of the prefetch table.

Flowchart 1702 is complete after step 1720 is performed, as indicated by step 1722.

Note that the flowchart 1702 is for the case when the foreign key is present in the top-level table and points to the prefetch table. In the case where the foreign key is present in the direction opposite to the prefetch path (i.e., from the prefetch table to the top-level table even though the prefetch hint is always from the top-level class to the prefetch class), the flowchart 1702 has to be modified in the following way: The foreign key will be fetched in the query generated for the prefetch table and not in the query for the top-level table as described above in step 1706. Also, step 1712 will need to order the top-level table's tuples by their primary key. In step 1718, the additional join (i.e., condition (2)) is changed to be as follows: "foreign key in table corresponding to prefetch class is equal to primary key corresponding to queried (or top-level) class". Finally, step 1720 should be changed to order the tuples of the prefetch table by the foreign key. The merging will be done using the primary key in the top-level table with the foreign key in the prefetch table. Note that the above applies for both 1-to 1 and 1-to-many cases but not for the many-to-many case.

Referring again to FIG. 7, if in step 718 the second query generator 404 determines that the prefetch path component does not define a one-to-many relationship, then the second query generator 404 concludes that the prefetch path component defines a many-to-many relationship. In this case, step 722 is performed.

In step 722, the second query generator 404 generates relational queries corresponding to the prefetch path component according to a Rule 3. The form of the resulting relational queries for a given object query, a prefetch path, a relational schema, and an object schema is shown in FIG. 13. An example of Rule 3 is presented in FIG. 10.

As indicated by FIG. 13, the second query generator 404 generates a first relational query, a second relational query, and a third relational query according to Rule 3 (the second query is shown as being below the first query, and the third query is shown as being below the second query). The first query operates to retrieve from the RDBMS 112 data to construct objects of the top-level class that satisfy the conditions present in the original object query. The tuples that are retrieved by the first query are sorted according to the primary key of the top-level table.

The intermediate table stores the foreign key from the top-level table that references the prefetch table. These foreign keys are called the top-level foreign keys for reference purposes. The intermediate table also stores the foreign key from the prefetch table that references the top-level table. These foreign keys are called the prefetch foreign keys for reference purposes. The second query operates to identify tuples in the intermediate table that satisfy the conditions present in the original object query, and that relate to the tuples retrieved by the first query (i.e., where the top-level foreign key is equal to the top-level table's foreign key). The second query retrieves from these identified tuples the top-level foreign key and the prefetch foreign key. These tuples retrieved by the second query are sorted by the top-level foreign key.

The third query operates to retrieve from the RDBMS 112 data to construct objects of the prefetch class that satisfy the conditions present in the original object query, and that relate to the tuples retrieved by the first query. The tuples that are retrieved by the third query are sorted according to the primary key of the prefetch table.

Figure 18A:
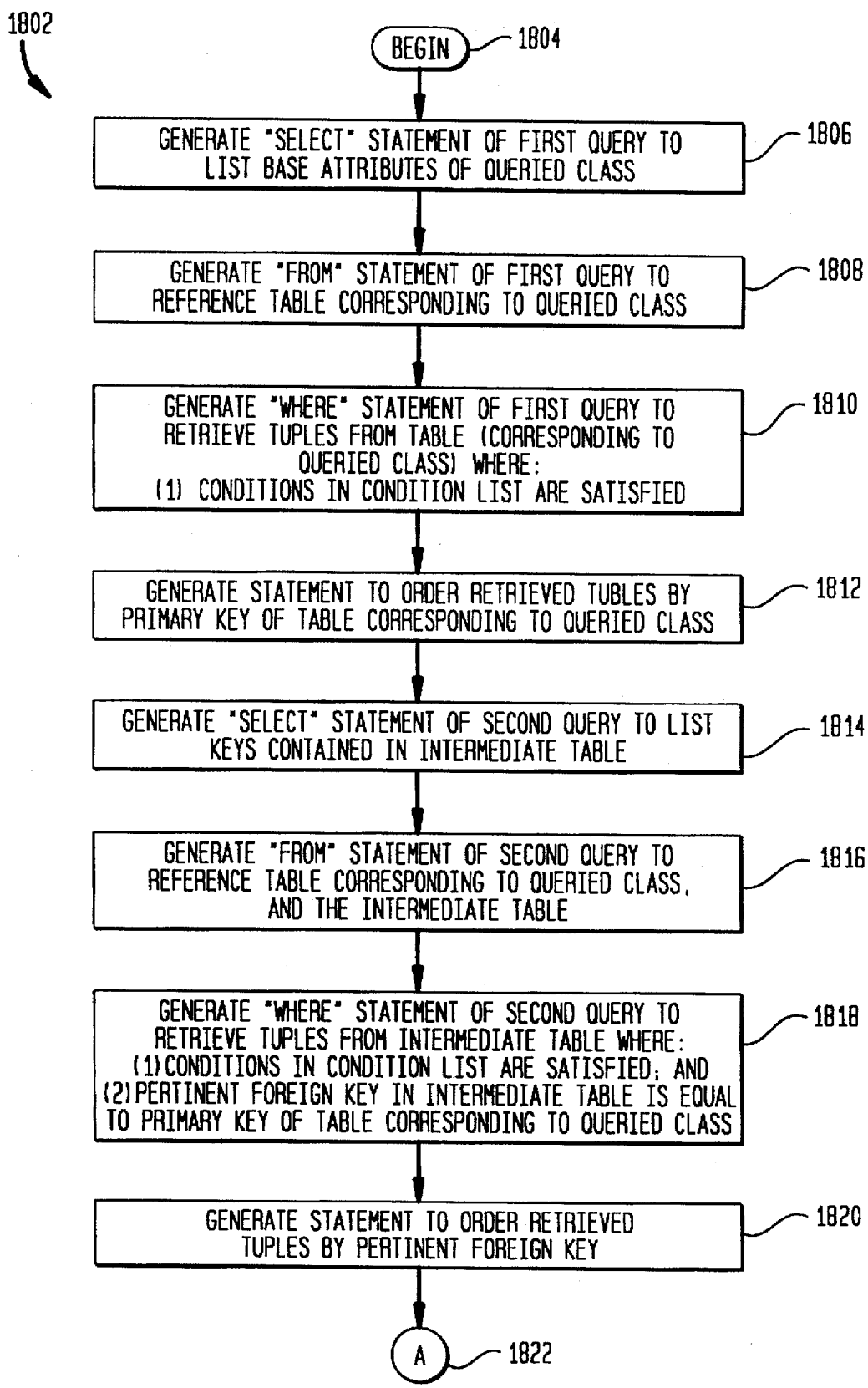
Figure 18B:
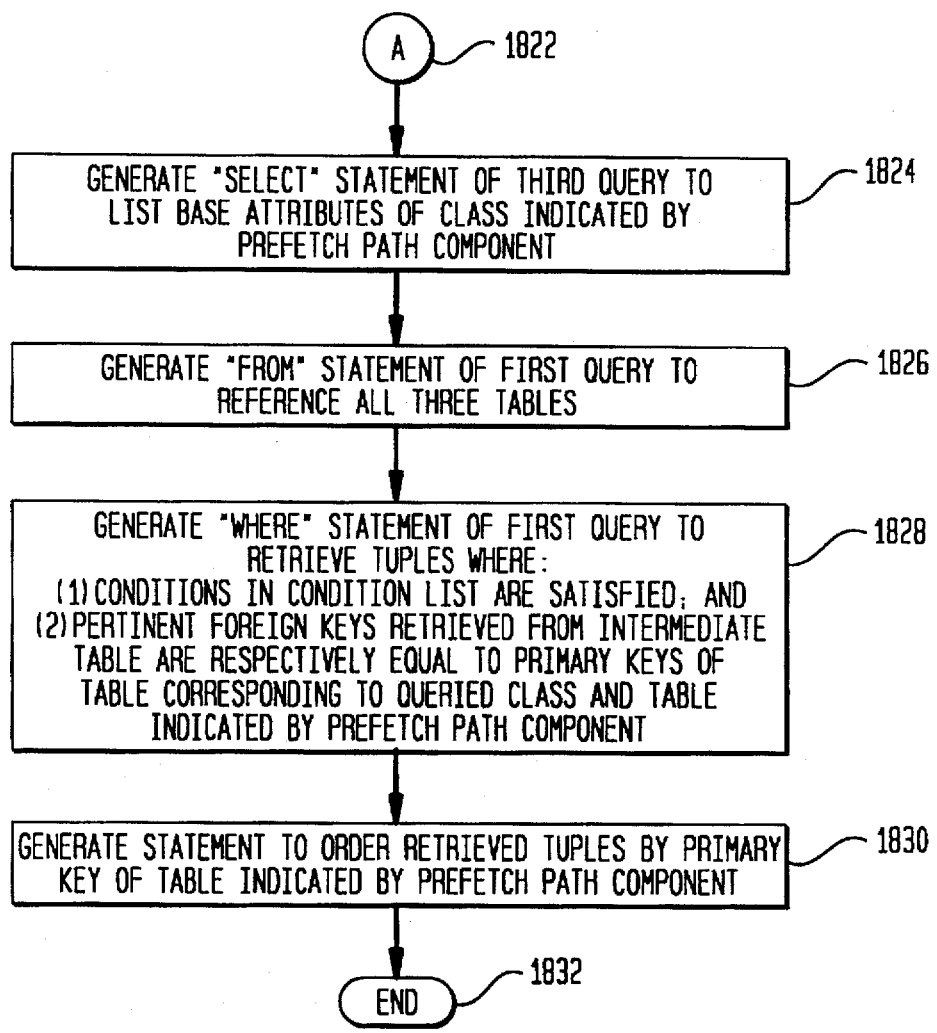

The manner in which the second query generator 404 generates relational queries in accordance with Rule 3 shall now be described with reference to a flowchart 1802 in FIGS. 18A and 18B. Flowchart 1802 begins with step 1804, where control immediately passes to step 1806.

In step 1806, the second query generator 404 generates the "select" statement of the first query such that this "select" statement lists the columns of the top-level table which map to the base attributes in the queried class. The second query generator 404 may query the schema mapping module 108 to obtain schema mapping information to perform step 1806.

In step 1808, the second query generator 404 generates the "from" statement of the first query so that this "from" statement references the top-level table.

In step 1810, the second query generator 404 generates the "where" statement of the first query so that this "where" statement operates to retrieve tuples of the top-level table where the conditions related to the queried class (and specified in the translated object query) are satisfied.

In step 1812, the second query generator 404 generates an "order by" statement to order the tuples retrieved from the top-level table by the primary key of the top-level table (in the example of FIG. 13, the primary key of the top-level table Xr is assumed to be x1.

In step 1814, the second query generator 404 generates the "select" statement of the second query such that this "select" statement lists the pertinent foreign keys (of the top-level and prefetch tables) stored in the intermediate table. (In the example of FIG. 13, table XY is the intermediate table.) The "pertinent foreign key" of the top-level table is the foreign key that is associated with the prefetch table (Xfk in the example of FIG. 13). The "pertinent foreign key" of the prefetch table is the foreign key that is associated with the top-level table (Yfk in the example of FIG. 13). The second query generator 404 may query the schema mapping module 108 to obtain schema mapping information to perform step 1814.

In step 1816, the second query generator 404 generates the "from" statement of the second query so that this "from" statement references the top-level table and the intermediate table.

In step 1818, the second query generator 404 generates the "where" statement of the second query so that this "where" statement operates to retrieve tuples of the intermediate table where: (1) the condition list (as specified in the translated object query) are satisfied; and (2) the primary key of the top-level table is equal to the pertinent foreign key of the top-level table (Xfk in the example of FIG. 13).

In step 1820, the second query generator 404 generates an "order by" statement to order the tuples retrieved from the intermediate table by the pertinent foreign key of the top-level table (Xfk in the example of FIG. 13).

In step 1824, the second query generator 404 generates the "select" statement for the third query such that this "select" statement lists the columns of the prefetch table which map to the base attributes in the prefetch class. The second query generator 404 may query the schema mapping module 108 to obtain schema mapping information to perform step 1824.

In step 1826, the second query generator 404 generates the "from" statement of the third query so that this "from" statement references the top-level table, the prefetch table, and the intermediate table.

In step 1828, the second query generator 404 generates the "where" statement of the third query so that this "where" statement operates to retrieve tuples of the prefetch table where (1) the condition list (as specified in the translated object query) are satisfied; (2) the top-level table's foreign key retrieved from the intermediate table is equal to the primary key in the top-level table; and (3) the prefetch table's foreign key retrieved from the intermediate table is equal to the primary key in the prefetch table.

In step 1830, the second query generator 404 generates an "order by" statement to order the tuples retrieved from the intermediate table by the primary key of the prefetch table.

Flowchart 1802 is complete after step 1830 is performed, as indicated by step 1832.

Alternate Embodiment for Generating Relational Queries

According to an alternate embodiment of the present invention, the second query generator 404 generates relational queries by modifying the parent query. Consider, for example, Rule 1c shown in FIG. 11. In the example of FIG. 11, the prefetch path component is "X.Y". As described above, the second query generator 404 generates a relational query (shown in FIG. 11; this query is called the "Y query" for reference purposes) according to Rule 1c to obtain data needed to construct objects of class Y. The parent query for this Y query is called the "X query" for reference purposes. For this particular example, the X query is equal to the translated object query (since X is the root or top-level class). The form of the translated object query (the X query) is as follows:

SELECT X.x1, ..., X.xn

FROM Xr X

WHERE <xlated_conditionlist>

According to the alternate embodiment of the present invention, the second query generator 404 modifies this X query in a straightforward manner to generate the Y query (rather than by starting from scratch as described above with reference to FIG. 16).

Now assume that the following prefetch path component also exists: X.Y.Z (where Z is another class in the object schema that maps to table Zr). According to the present invention, the second query generator 404 generates a relational query (called the "Z query" for reference purposes) to obtain data needed to construct objects of class Z. The parent query for the Z query is the Y query, shown in FIG. 11. According to the alternate embodiment of the present invention, the second query generator 404 modifies the Y query to generate the Z query.

The same is true for Rules 1a, 1b, 2, and 3. Consider Rule 1a. According to this alternate embodiment, the first query is partially generated by modifying its parent query. In some cases, the parent query of the first query is the translated object query (although this is not always the case). Similarly, the second query is generated by modifying its parent query. According to the present invention, the second query's parent query is defined to be the first query. Thus, the second query is generated by modifying the partially completed first query. The form of the first query is finalized after the second query is generated.

For example, consider again the translated object query:

SELECT X.x1, ..., X.xn

FROM Xr X

WHERE <xlated_conditionlist>

The first query is partially generated by modifying its parent query (the translated object query), such that the partially completed first query is as follows:

SELECT X.x1, ..., X.xn

FROM Xr X

WHERE <xlated_conditionlist>

In other words, the partially completed first query is simply equal to the translated object query. The second query is then generated by modifying its parent query, i.e., the partially completed first query. Steps similar to steps 1412–1416 in flowchart 1402 are performed to implement such modifications. Then, the first query is modified and its form is finalized. In particular, a step similar to step 1410 is performed to add the condition "AND X.Yfk =Y.y1" to the "where" statement. It is advantageous to add this condition to the "where" statement at this point, since we can then implement the query generation algorithm by efficiently making a single traversal of the nested path (comprising the set of all prefetch paths), generating the query for the parent and then transforming the parent query to generate the query for the child, and so on.

The manner in which the second query generator 404 implements Rules 1b, 2, and 3 according to this alternate embodiment will be apparent to persons skilled in the relevant art based on the above discussion.

Multiple Prefetch Paths

The rules described above only handle one prefetch path. It is possible that multiple prefetch paths will exist for the same object query. An example of multiple prefetch paths on a many-to-many relationship and the chosen query plan is given in FIG. 19. Notice that the number of queries executed may increase with each additional prefetch path. In addition to generating more queries, handling multiple prefetch paths may require multiple sorts on the same set of objects. Unlike in the single prefetch path case, where the sort on a foreign key could always be pushed to the RDBMS 112, in the case of multiple prefetch paths, only one sort per class (or table) can be delegated to the RDBMS 112 (using an ORDER BY clause) and the other sorts are executed in the gateway 106 using intermediate types. Also, even in the single prefetch path case, there are cases where extra merges and sorts must be performed in the gateway (e.g., Rule 3a).

Alternate Embodiments

As described above, the present invention includes the first query generator 402, the second query generator 404, and the schema mapping module 108. This embodiment assumes that the user or application provides zero or more prefetch paths with the original object query.

According to an alternate embodiment, the present invention represents the second query generator 404 only, operating in an environment containing the application 104, the object-oriented DBMS 110, and the RDBEMS 112. This alternate embodiment also assumes that the user or application provides zero or more prefetch paths. This alternate embodiment further assumes that the environment in which the second query generator 404 is contained includes some schema mapping mechanism (such as the schema mapping module 108) for providing schema mapping information when appropriately queried, and some initial query generator (such as the first query generator 402) for generating the translated object query from the original object query. It is assumed that the second query generator 404 receives any schema mapping information that it requires (the details of such information are discussed above), and that it receives the translated object query.

While various embodiments of the present invention have been described above, it should be understood that they have been presented by way of example only, and not limitation. Thus, the breadth and scope of the present invention should not be limited by any of the abovedescribed exemplary embodiments, but should be defined only in accordance with the following claims and their equivalents.

While the invention has been particularly shown and described with reference to (a) preferred embodiment(s) thereof, it will be understood by those skilled in the art that (various changes) (the foregoing and other changes) in form and details may be made therein without departing from the spirit and scope of the invention.

Having thus described our invention, what I claim as new and desire to secure by Letters Patent is:

1. A method of processing object-oriented queries so as to retrieve data from a relational database management system (RDBMS), comprising the steps of:

(1) receiving an object-oriented query and at least one prefetch path from an object-oriented source, said at least one prefetch path identifying one or more objects which are desired to be constructed;

(2) translating said object-oriented query to a translated object query, said translated object query being a relational database query capable of retrieving from said RDBMS data to initialize base attributes of top-level objects identified by said object-oriented query;

(3) generating from said translated object query and said at least one prefetch path a set of relational queries capable of retrieving from said RDBMS data to construct said objects identified by said at least one prefetch path; and (4) causing said RDBMS to process said set of relational queries.

2. The method of claim 1 in which said object-oriented query includes a condition list, and in which said at least one prefetch path includes at least one prefetch path component, wherein step (3) comprises the steps of:

(a) determining whether said prefetch path component defines a (0,1)-to-(0,1) relationship;

(b) if said prefetch path component defines a (0,1)-to-(0,1) relationship, then:

(i) generating a first relational query which, when processed by the RDBMS, operates to retrieve from the RDBMS data needed to construct objects of a top-level class not pointing to objects along said prefetch path component, and which satisfy said condition list; and (ii) generating a second relational query which, when processed by the RDBMS, operates to retrieve from the RDBMS data needed to construct objects of said top-level class which point to objects along said prefetch path component, and which satisfy said condition list, said second relational query also operating to retrieve from the RDBMS data needed to construct said objects along said prefetch path component.

3. The method of claim 1 in which said object-oriented query includes a condition list, and in which said at least one prefetch path includes at least one prefetch path component, wherein step (3) comprises the steps of:

(a) determining whether said prefetch path component defines a (1,1)-to-(1,1) relationship; and (b) if said prefetch path component defines a (1,1)-to-(1,1) relationship, then generating a relational query which, when processed by the RDBMS, operates to retrieve from the RDBMS data needed to construct objects of a top-level class which point to objects along said prefetch path component, and which satisfy said condition list, said relational query also operating to retrieve from the RDBMS data needed to construct said objects along said prefetch path component.

4. The method of claim 1 in which said object-oriented query includes a condition list, and in which said at least one prefetch path includes at least one prefetch path component, wherein step (3) comprises the steps of:

(a) determining whether said prefetch path component defines a one-to-many relationship;

(b) if said prefetch path component defines a one-to-many relationship, then:

(i) generating a first relational query which, when processed by the RDBMS, operates to retrieve from the RDBMS data needed to construct objects of a top-level class that satisfy said condition list; and (ii) generating a second relational query which, when processed by the RDBMS, operates to retrieve from the RDBMS data needed to construct objects along said prefetch path component that are pointed to by said objects of said top-level class.

5. The method of claim 4 in which said top-level class maps to a top-level table, and said prefetch path component identifies a prefetch class that maps to a prefetch table, wherein step (b) further comprises the steps of:

(iii) generating a first relational database command which, when processed by the RDBMS, causes the RDBMS to sort tuples retrieved by operation of said first relational query according to a foreign key in said top-level table that identifies tuples in said prefetch table; and (iv) generating a second relational database command which, when processed by the RDBMS, causes the RDBMS to sort tuples retrieved by operation of said second relational query according to a primary key of said prefetch table.

6. The method of claim 5, further comprising the step of:

(5) merging said sorted tuples retrieved by operation of said first and second relational queries.

7. The method of claim 1 in which said object-oriented query includes a condition list, said at least one prefetch path includes at least one prefetch path component, said object-oriented query identifies a top-level class that maps to a top-level table, said prefetch path component identifies a prefetch class that maps to a prefetch table, and in which an intermediate table is maintained by the RDBMS that stores a top-level foreign key from said top-level table that references said prefetch table, and a prefetch foreign key from said prefetch table that references said top-level table, wherein step (3) comprises the steps of:

(a) determining whether said prefetch path component defines a many-to-many relationship;

(b) if said prefetch path component defines a manyto-many relationship, then:

(i) generating a first relational query which, when processed by the RDBMS, operates to retrieve from the RDBMS data needed to construct objects of said top-level class that satisfy said condition list;

(ii) generating a second relational query which, when processed by the RDBMS, operates to retrieve from said RDBMS said top-level foreign key and said prefetch foreign key from tuples of said intermediate table that satisfy said condition list; and (iii) generating a third relational query which, when processed by the RDBMS, operates to retrieve from the RDBMS data needed to construct objects of said prefetch class that satisfy said condition list and that are pointed to by said top-level class objects as indicated by said retrieved top-level and prefetch foreign keys.

8. The method of claim 7, wherein step (b) further comprises the steps of:

(iv) generating a first relational database command which, when processed by the RDBMS, causes the RDBMS to sort tuples retrieved by operation of said first relational query according to a primary key of said top-level table;

(v) generating a second relational database command which, when processed by the RDBMS, causes the RDBMS to sort tuples retrieved by operation of said second relational query according to said top-level foreign key; and (vi) generating a third relational database command which, when processed by the RDBMS, causes the RDBMS to sort tuples retrieved by operation of said third relational query according to a primary key of said prefetch table.

9. The method of claim 8, further comprising the step of:

(5) merging said sorted tuples retrieved by operation of said first, second, and third relational queries.

10. The method of claim 1, wherein step (3) comprises the steps of:

(a) generating a nested path representation of said at least one prefetch path; and (b) traversing said nested path representation to generate said set of relational queries.

11. The method of claim 1, wherein said at least one prefetch path specifies a class pointed to by a relationship attribute, whereby said one or more objects identified by the prefetch path correspond to said class pointed to by said relationship attribute.

12. A method of processing object-oriented queries so as to retrieve data from a non-object oriented database management system (DBMS), comprising the steps of:

(1) receiving a translated object query generated from an object-oriented query having at least one prefetch path, said at least one prefetch path identifying one or more objects which are desired to be constructed, said translated object query being a relational database query capable of retrieving from said DBMS data to initialize base attributes of top-level objects identified by said object-oriented query;

(2) generating from said translated object query and said at least one prefetch path a set of relational queries capable of retrieving from said DBMS data to construct said objects identified by said at least one prefetch path; and (3) causing said DBMS to process said set of relational queries.

13. A database system, comprising:

a relational database management system (RDBMS);

an object-relational database gateway for receiving an object-oriented query and at least one prefetch path from an object-oriented source, said at least one prefetch path identifying one or more objects which are desired to be constructed;

said gateway comprising:

a first query generator for translating said object-oriented query to a translated object query, said translated object query being a relational database query capable of retrieving from said RDBMS data to initialize base attributes of top-level objects identified by said object-oriented query;

a second query generator for generating from said translated object query and said at least one prefetch path a set of relational queries capable of retrieving from said RDBMS data to construct said objects identified by said at least one prefetch path; and means for causing said RDBMS to process said set of relational queries.

14. The system of claim 13 in which said object-oriented query includes a condition list, and in which said at least one prefetch path includes at least one prefetch path component, wherein said second query generator comprises:

means for determining whether said prefetch path component defines a (0,1)-to-(0,1) relationship;

means for generating first and second relational queries when said prefetch path component defines a (0,1)-to-(0,1) relationship, wherein:

(i) said first relational query, when processed by the RDBMS, operates to retrieve from the RDBMS data needed to construct objects of a top-level class not pointing to objects along said prefetch path component, and which satisfy said condition list; and (ii) said second relational query, when processed by the RDBMS, operates to retrieve from the RDBMS data needed to construct objects of said top-level class which point to objects along said prefetch path component, and which satisfy said condition list, said second relational query also operating to retrieve from the RDBMS data needed to construct said objects along said prefetch path component.

15. The system of claim 13 in which said object-oriented query includes a condition list, and in which said at least one prefetch path includes at least one prefetch path component, wherein said second query generator comprises:

means for determining whether said prefetch path component defines a (1,1)-to-(1,1) relationship; and means for generating, if said prefetch path component defines a (1,1)-to-(1,1) relationship, a relational query which, when processed by the RDBMS, operates to retrieve from the RDBMS data needed to construct objects of a top-level class which point to objects along said prefetch path component, and which satisfy said condition list, said relational query also operating to retrieve from the RDBMS data needed to construct said objects along said prefetch path component.

16. The system of claim 13 in which said object-oriented query includes a condition list, and in which said at least one prefetch path includes at least one prefetch path component, wherein said second query generator comprises:

means for determining whether said prefetch path component defines a one-to-many relationship;

means for generating first and second relational queries when said prefetch path component defines a one-to-many relationship, wherein:

(i) said first relational query, when processed by the RDBMS, operates to retrieve from the RDBMS data needed to construct objects of a top-level class that satisfy said condition list; and (ii) said second relational query, when processed by the RDBMS, operates to retrieve from the RDBMS data needed to construct objects along said prefetch path component that are pointed to by said objects of said top-level class.

17. The system of claim 16 in which said top-level class maps to a top-level table, and said prefetch path component identifies a prefetch class that maps to a prefetch table, wherein said second query generator further comprises:

means for generating a first relational database command which, when processed by the RDBMS, causes the RDBMS to sort tuples retrieved by operation of said first relational query according to a foreign key in said top-level table that identifies tuples in said prefetch table; and means for generating a second relational database command which, when processed by the RDBMS, causes the RDBMS to sort tuples retrieved by operation of said second relational query according to a primary key of said prefetch table.

18. The system of claim 17, further comprising:

means for merging said sorted tuples retrieved by operation of said first and second relational queries.

19. The system of claim 13 in which said object-oriented query includes a condition list, said at least one prefetch path includes at least one prefetch path component, said object-oriented query identifies a top-level class that maps to a top-level table, said prefetch path component identifies a prefetch class that maps to a prefetch table, wherein said RDBMS maintains an intermediate table that stores a top-level foreign key from said top-level table that references said prefetch table, and a prefetch foreign key from said prefetch table that references said top-level table, and wherein said second query generator comprises:

means for determining whether said prefetch path component defines a many-to-many relationship;

means for generating first, second, and third relational queries when said prefetch path component defines a many-to-many relationship, wherein:

(i) said first relational query, when processed by the RDBMS, operates to retrieve from the RDBMS data needed to construct objects of said top-level class that satisfy said condition list;

(ii) said second relational query, when processed by the RDBMS, operates to retrieve from said RDBMS said top-level foreign key and said prefetch foreign key from tuples of said intermediate table that satisfy said condition list; and (iii) said third relational query, when processed by the RDBMS, operates to retrieve from the RDBMS data needed to construct objects of said prefetch class that satisfy said condition list and that are pointed to by said top-level class objects as indicated by said retrieved top-level and prefetch foreign keys.

20. The system of claim 19, wherein said second query generator further comprises:

means for generating a first relational database command which, when processed by the RDBMS, causes the RDBMS to sort tuples retrieved by operation of said first relational query according to a primary key of said top-level table;

means for generating a second relational database command which, when processed by the RDBMS, causes the RDBMS to sort tuples retrieved by operation of said second relational query according to said top-level foreign key; and means for generating a third relational database command which, when processed by the RDBMS, causes the RDBMS to sort tuples retrieved by operation of said third relational query according to a primary key of said prefetch table.

21. The system of claim 20, further comprising:

means for merging said sorted tuples retrieved by operation of said first, second, and third relational queries.

22. The database system of claim 13, wherein said at least one prefetch path specifies a class pointed to by a relationship, whereby said one or more objects identified by the prefetch path correspond to said class pointed to by said relationship attribute.

23. A computer system, comprising:

a processor;

a relational database management system (RDBMS);

a controller for enabling said processor to process object-oriented queries so as to retrieve data from said RDBMS, comprising:

means for enabling said processor to receive an object-oriented query and at least one prefetch path from an object-oriented source, said at least one prefetch path identifying one or more objects which are desired to be constructed;

a first query generator for enabling said processor to translate said object-oriented query to a translated object query, said translated object query being a relational database query capable of retrieving from said RDBMS data to initialize base attributes of top-level objects identified by said object-oriented query;

a second query generator for enabling said processor to generate from said translated object query and said at least one prefetch path a set of relational queries capable of retrieving from said RDBMS data to construct said objects identified by said at least one prefetch path; and means for enabling said processor to cause said RDBMS to process said set of relational queries.

24. The computer system of claim 23, wherein said at least one prefetch path specifies a class pointed to by a relationship, whereby said one or more objects identified by the prefetch path correspond to said class pointed to by said relationship attribute.

25. A controller, for use in a computer system comprising a processor and a relational database management system (RDBMS), for enabling the processor to process object-oriented queries so as to retrieve data from said RDBMS, comprising:

means for enabling the processor to receive an object-oriented query and at least one prefetch path from an object-oriented source, said at least one prefetch path identifying one or more objects which are desired to be constructed;

a first query generator for enabling the processor to translate said object-oriented query to a translated object query, said translated object query being a relational database query capable of retrieving from said RDBMS data to initialize base attributes of top-level objects identified by said object-oriented query;

a second query generator for enabling the processor to generate from said translated object query and said at least one prefetch path a set of relational queries capable of retrieving from said RDBMS data to construct said objects identified by said at least one prefetch path; and means for enabling the processor to cause said RDBMS to process said set of relational queries.

26. A method of processing object-oriented queries so as to retrieve data from a relational database management system (RDBMS), comprising the steps of:

(1) receiving an object-oriented query and at least one prefetch path from an object-oriented source, said at least one prefetch path identifying one or more objects which are desired to be constructed;

(2) translating said object-oriented query to a translated object query, said translated object query being a relational database query capable of retrieving data from said RDBMS; and (3) generating from said translated object query and said at least one prefetch path a set of relational queries capable of retrieving from said RDBMS data to construct said objects identified by said at least one prefetch path.

27. The method of claim 26 further comprising the step of:

(4) causing said RDBMS to process said set of relational queries.

28. The method of claim 26, wherein said translated object query retrieves data from said RDBMS data to initialize base attributes of top-level objects identified by said object-oriented query.

\* \* \* \* \*